United States Patent
Ogawa et al.

(10) Patent No.: US 10,156,932 B2
(45) Date of Patent: Dec. 18, 2018

(54) MOBILE ELECTRONIC DEVICE, METHOD OF CONTROLLING MOBILE ELECTRONIC DEVICE, AND RECORDING MEDIUM

(71) Applicant: KYOCERA CORPORATION, Kyoto (JP)

(72) Inventors: Shinya Ogawa, Osaka (JP); Mamoru Takahashi, Nagoya (JP)

(73) Assignee: KYOCERA CORPORATION, Kyoto (JP)

(*) Notice: Subject to any disclaimer, the term of this patent is extended or adjusted under 35 U.S.C. 154(b) by 52 days.

(21) Appl. No.: 15/379,340

(22) Filed: Dec. 14, 2016

(65) Prior Publication Data

US 2017/0097723 A1 Apr. 6, 2017

Related U.S. Application Data

(63) Continuation of application No. PCT/JP2015/068329, filed on Jun. 25, 2015.

(30) Foreign Application Priority Data

Jun. 26, 2014 (JP) .................................. 2014-131388

(51) Int. Cl.
G06F 3/041 (2006.01)
G06F 3/044 (2006.01)
G02F 1/1333 (2006.01)

(52) U.S. Cl.
CPC ........ *G06F 3/0416* (2013.01); *G02F 1/13338* (2013.01); *G06F 3/044* (2013.01);
(Continued)

(58) Field of Classification Search
CPC .... G06F 3/017; G06F 3/04883; G06F 3/0487; G06F 3/0488; G06F 3/04886; G06F 2203/04808
See application file for complete search history.

(56) References Cited

U.S. PATENT DOCUMENTS 7,653,883 B2* 1/2010 Hotelling .............. G06F 3/0485
715/863
8,884,897 B2* 11/2014 Sashida ................... G06F 3/016
178/18.04
(Continued)

FOREIGN PATENT DOCUMENTS

JP 2009-181232 A 8/2008
JP 2012-203895 10/2012
(Continued)

OTHER PUBLICATIONS

International Search Report in international application No. PCT/JP2015/068329, dated Aug. 11, 2015, in 1 page.
(Continued)

*Primary Examiner* — William Lu
(74) *Attorney, Agent, or Firm* — Duane Morris LLP

(57) ABSTRACT

A mobile electronic device comprises a display, an operation detector, and a processor. The operation detector is capable of detecting a first touch operation and a second touch operation on the display performed by a part of a human body. The processor is configured to execute a control process responsive to the first touch operation and the second touch operation. The part of the human body performing the second touch operation is located in a position farther from the display than a position of the part of the human body performing the first touch operation. The processor is configured to execute the control process while handling the first touch operation and the second touch operation performed continuously as a single touch operation, depending on a time lag between the first touch operation and the second touch operation.

5 Claims, 25 Drawing Sheets

(52) U.S. Cl.
CPC .......... *G06F 3/0412* (2013.01); *G06F 3/0418* (2013.01); *G06F 2203/04101* (2013.01)

(56) References Cited

U.S. PATENT DOCUMENTS

| | | | | |
|---|---|---|---|---|
| 2009/0058830 | A1* | 3/2009 | Herz | G06F 3/044 345/173 |
| 2011/0074544 | A1* | 3/2011 | D'Souza | G06F 3/0416 340/5.83 |
| 2011/0316790 | A1* | 12/2011 | Ollila | G06F 3/04883 345/173 |
| 2012/0162105 | A1* | 6/2012 | Sakurai | G06F 3/0488 345/173 |
| 2012/0233571 | A1* | 9/2012 | Wever | G06F 3/048 715/835 |
| 2012/0236037 | A1* | 9/2012 | Lessing | G06F 3/017 345/661 |
| 2013/0246861 | A1* | 9/2013 | Colley | G06F 3/0488 714/48 |
| 2013/0328828 | A1* | 12/2013 | Tate | G06F 3/044 345/174 |
| 2014/0118276 | A1* | 5/2014 | Chiu | G06F 3/0416 345/173 |
| 2014/0204045 | A1 | 7/2014 | Komoto | |
| 2014/0218337 | A1* | 8/2014 | Yamaguchi | G06F 3/044 345/174 |
| 2014/0240242 | A1* | 8/2014 | Kawalkar | G06F 3/0418 345/173 |

FOREIGN PATENT DOCUMENTS

| | | |
|---|---|---|
| JP | 2012-226691 | 11/2012 |
| WO | 2013021858 A1 | 2/2013 |

OTHER PUBLICATIONS

Written Opinion of the International Searching Authority in international application No. PCT/JP2015/068329, dated Aug. 11, 2015, and Statement of Relevance of Non-English References Cited Therein, in 5 pages.

Official Action dated Nov. 21, 2017, in corresponding Japanese Patent Application No. 2014-131388, with Concise Explanation/Statement of Relevance of Non-English References.

* cited by examiner

F I G . 2
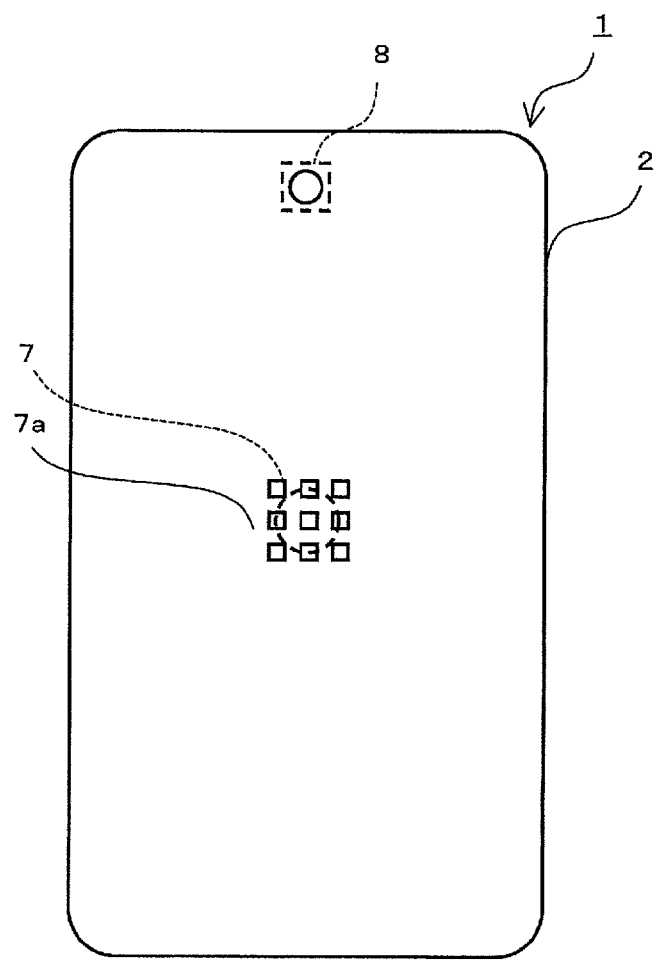
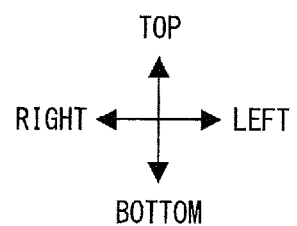

FIG. 3
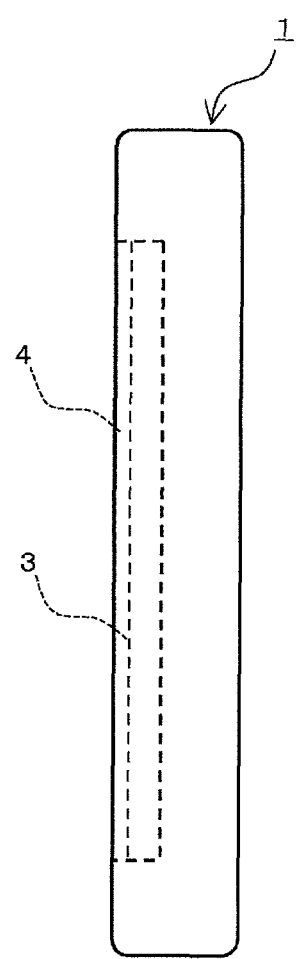
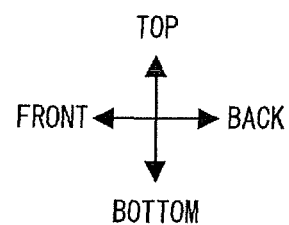

F I G . 5
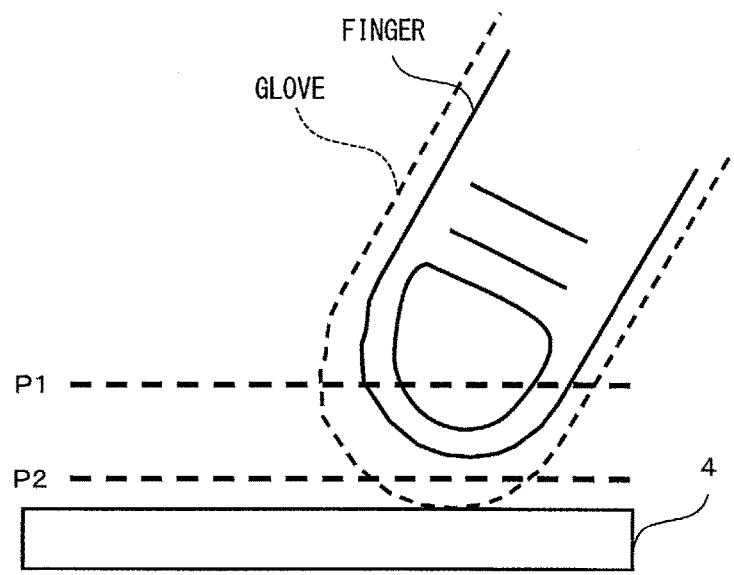
F I G . 6
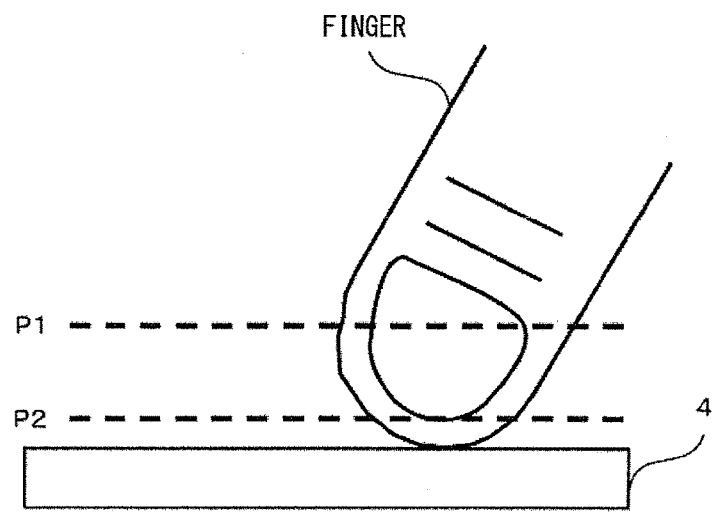

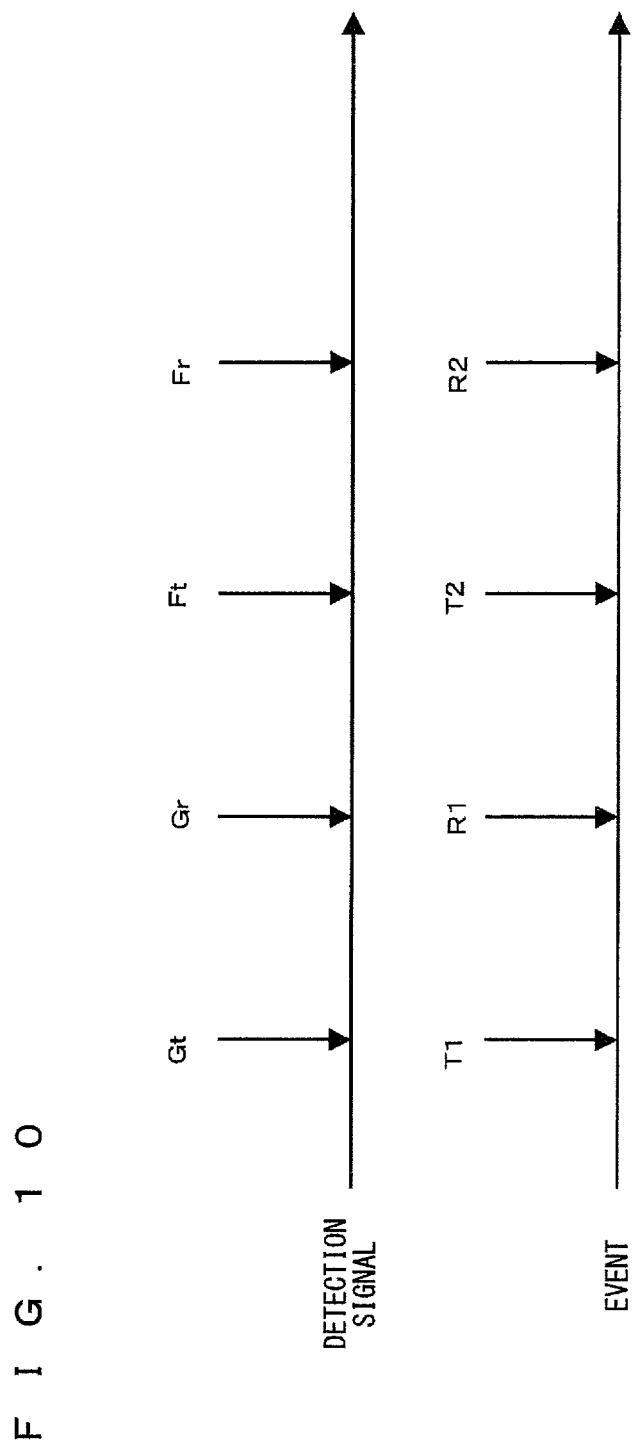

F I G . 1 1
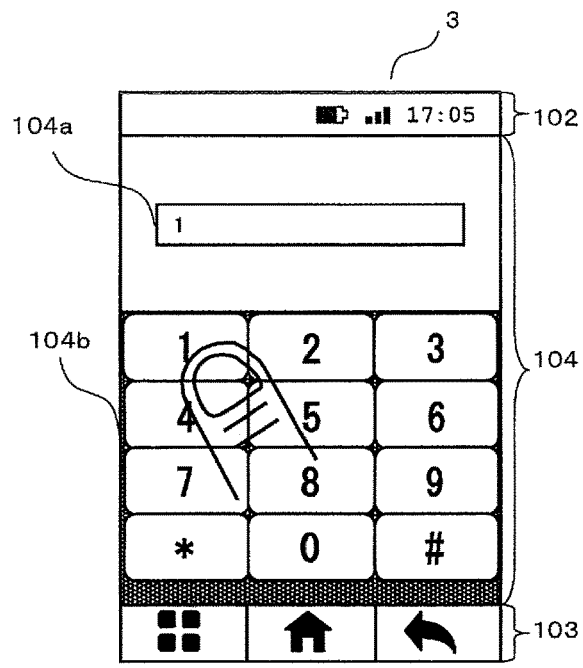
F I G . 1 2
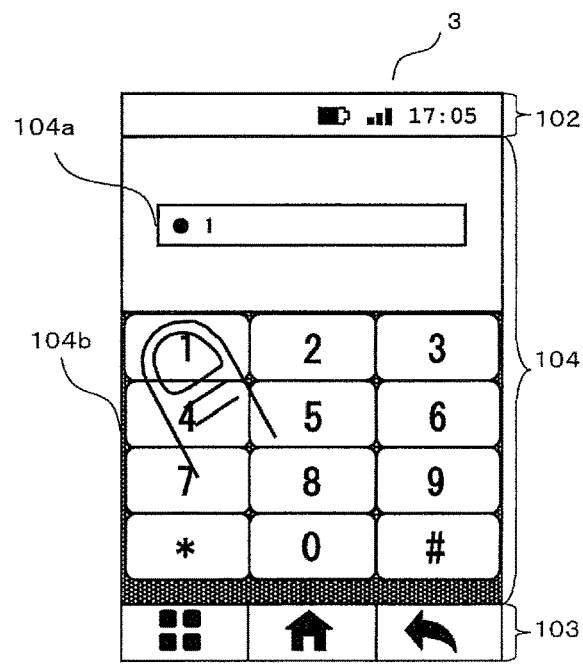

F I G . 1 3
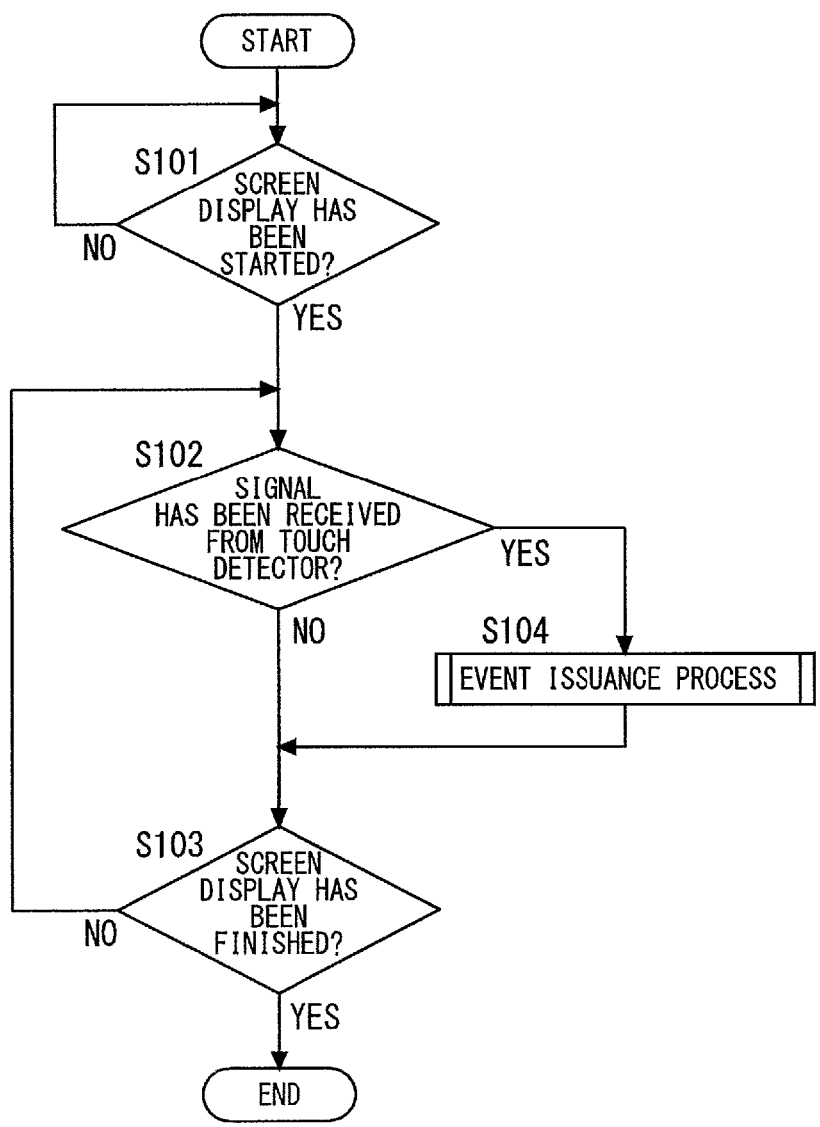

F I G . 3 0
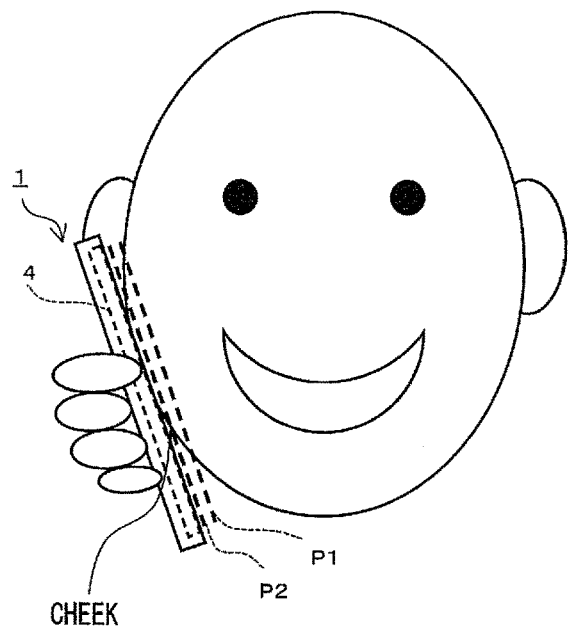
F I G . 3 1
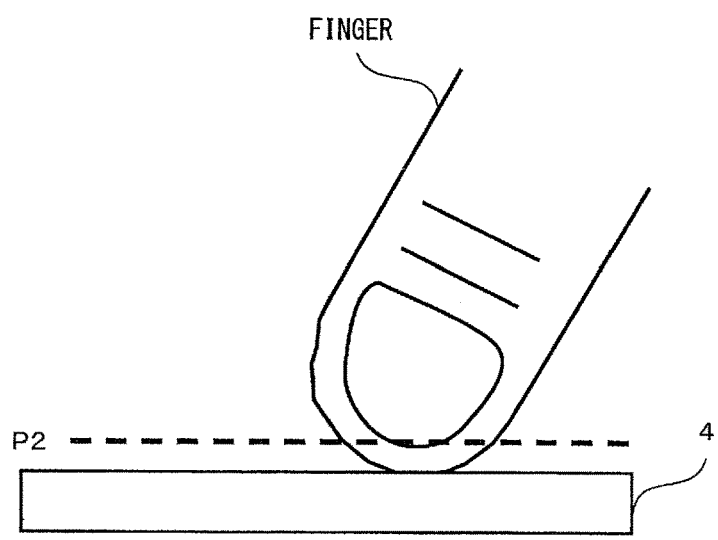

F I G . 3 2
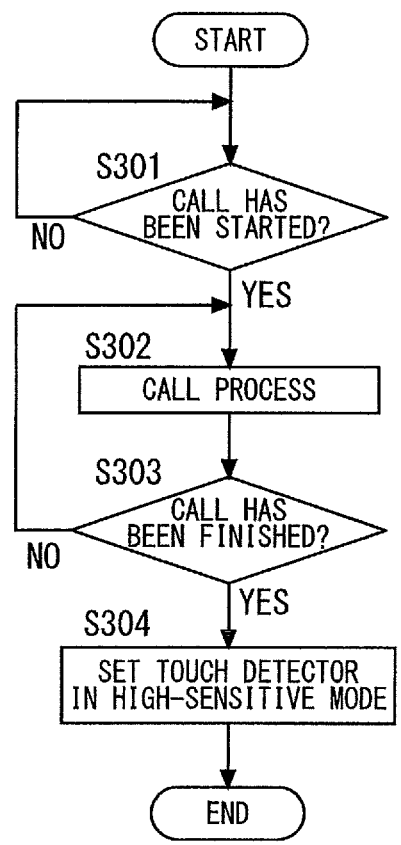

MOBILE ELECTRONIC DEVICE, METHOD OF CONTROLLING MOBILE ELECTRONIC DEVICE, AND RECORDING MEDIUM

CROSS-REFERENCE TO RELATED APPLICATION

The present application is a continuation based on PCT Application No. PCT/JP2015/068329 filed on Jun. 25, 2015, entitled "PORTABLE ELECTRONIC APPARATUS, PORTABLE ELECTRONIC APPARATUS CONTROL METHOD, AND RECORDING MEDIUM," which claims the benefit of Japanese Application No. 2014-131388 filed on Jun. 26, 2014, entitled "MOBILE ELECTRONIC DEVICE, METHOD OF CONTROLLING MOBILE ELECTRONIC DEVICE, AND PROGRAM." The content of which are incorporated by reference herein in their entirety.

FIELD

Embodiments of the present disclosure relate generally to a mobile electronic device.

BACKGROUND

A structure with a display having a touch panel on the front of a casing is a mainstream structure employed in recent years for a mobile terminal such as a mobile phone. A mobile terminal of this structure detects an operation on the display by a user using the touch panel.

SUMMARY

A mobile electronic device, a method of controlling a mobile electronic device, and a recording medium are disclosed. In one embodiment, a mobile electronic device comprises a display, an operation detector, and a processor. The operation detector is capable of detecting a first touch operation and a second touch operation on the display performed by a part of a human body. The processor is configured to execute a control process responsive to the first touch operation and the second touch operation. The part of the human body performing the second touch operation is located in a position farther from the display than a position of the part of the human body performing the first touch operation. The processor is configured to execute the control process while handling the first touch operation and the second touch operation performed continuously as a single touch operation, depending on a time lag between the first touch operation and the second touch operation.

In one embodiment, a method of controlling a mobile electronic device is a method of controlling a mobile electronic device comprising a display and an operation detector. The operation detector is capable of detecting a first touch operation and a second touch operation on the display performed by a part of a human body. The part of the human body performing the second touch operation is located in a position farther from the display than a position of the part of the human body performing the first touch operation. The method comprises a step of detecting a time lag between the first touch operation and the second touch operation. The method comprises a step of executing a control process while handling the first touch operation and the second touch operation performed continuously as a single touch operation depending on the time lag.

In one embodiment, a recording medium is a computer-readable non-transitory recording medium storing a control program. The control program is for controlling a mobile electronic device comprising a display and an operation detector. The operation detector is capable of detecting a first touch operation and a second touch operation on the display performed by a part of a human body. The part of the human body performing the second touch operation is located in a position farther from the display than a position of the part of the human body performing the first touch operation. The control program causes the mobile electronic device to execute a control process while causing the mobile electronic device to handle the first touch operation and the second touch operation performed continuously as a single touch operation, depending on a time lag between the first touch operation and the second touch operation.

BRIEF DESCRIPTION OF THE DRAWINGS

FIG. 2 illustrates the structure of the mobile phone;
FIG. 3 illustrates the structure of the mobile phone;
FIG. 5 illustrates a schematic view showing a relationship between a touch panel and a detection threshold;
FIG. 6 illustrates a schematic view showing a relationship between the touch panel and the detection threshold;
FIG. 10 illustrates a conceptual view showing timing of issuance of a touch event and a release event by a controller;
FIG. 11 illustrates a schematic view showing an example of entry on a lock screen with a finger being moved closer to the touch panel slowly;
FIG. 12 illustrates a schematic view showing an example of entry on the lock screen with the finger being moved closer to the touch panel slowly;
FIG. 13 illustrates a flowchart showing a touch detection control process.

FIG. 30 illustrates a schematic view showing how a mode is set at the touch detector depending on the state of an operation on the touch panel;

FIG. 31 illustrates a schematic view showing how a mode is set at the touch detector depending on the state of an operation on the touch panel;

FIG. 32 illustrates a flowchart showing a call control process;

DETAILED DESCRIPTION

Figure 1:
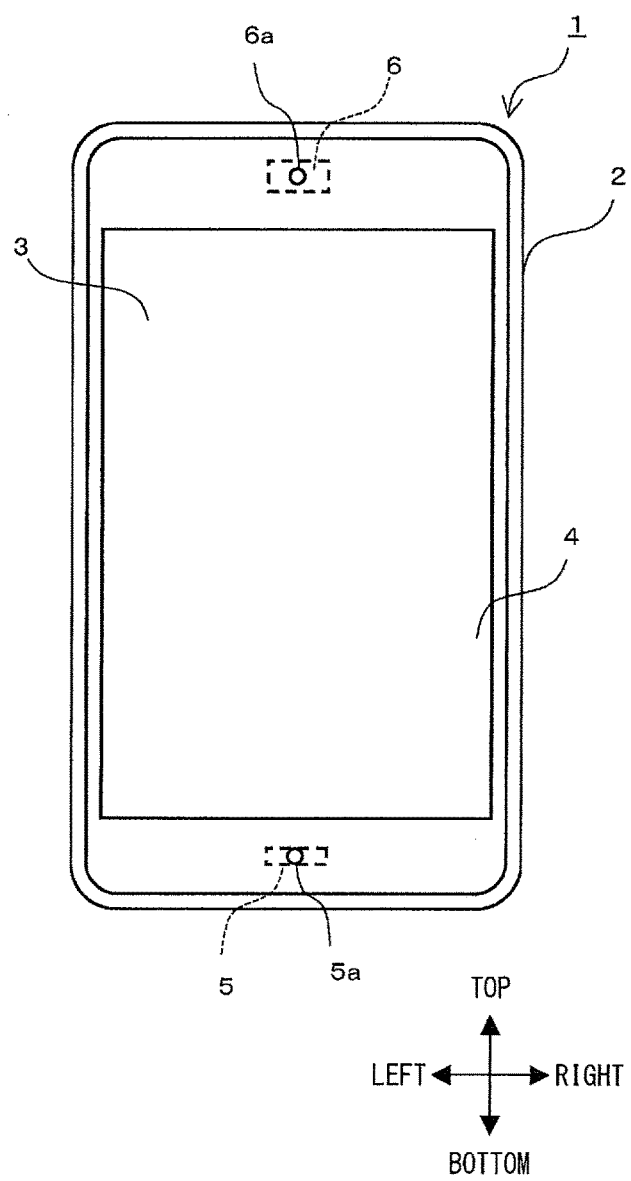
FIG. 1 illustrates the structure of a mobile phone.

FIGS. 1 to 3 are a front view, a back view, and a right side view of a mobile phone 1 respectively. As illustrated in FIGS. 1 to 3, for the convenience of description, the lengthwise direction of a cabinet 2 will hereinafter be defined as a vertical direction and the widthwise direction of the cabinet 2 as a horizontal direction. Further, a direction perpendicular to the vertical direction and the horizontal direction will be defined as a front-back direction.

As illustrated in FIGS. 1 to 3, the mobile phone 1 includes the cabinet 2, a display 3, a touch panel 4, a microphone 5, a call speaker 6, an external speaker 7, and a camera 8.

The cabinet 2 has a substantially rectangular outline when viewed from the front. The display 3 is arranged on the front side of the cabinet 2. Various images (screens) are displayed on the display 3. The display 3 is a liquid crystal display, and includes a liquid crystal panel and an LED backlight to illuminate the liquid crystal panel. The display 3 may be a display of a different type such as an organic EL display. The touch panel 4 is arranged to cover the display 3. The touch panel 4 is formed into a transparent sheet-like shape. Various types of touch panels are applicable as the touch panel 4 such as a capacitive touch panel, an ultrasonic touch panel, a pressure-sensitive touch panel, a resistive touch panel, and a photo-detection touch panel.

The microphone 5 is provided at a lower end portion of the inside of the cabinet 2. The call speaker 6 is provided at an upper end portion of the inside of the cabinet 2. The microphone 5 can accept voice having passed through a microphone hole 5a formed in the front of the cabinet 2. The microphone 5 can generate an electrical signal responsive to input sound. The call speaker 6 can output sound. Sound output from the call speaker 6 passes through an output hole 6a formed in the front of the cabinet 2 and is then emitted to the outside of the cabinet 2. During a call, voice received from a device as a communication partner (such as a mobile phone) is output from the call speaker 6. Voice given by a user is input to the microphone 5. Sound includes various types of sound such as voice and announcing sound, for example.

The external speaker 7 is provided inside the cabinet 2. Output holes 7a are provided in a region on the back of the cabinet 2 and facing the external speaker 7. Sound output from the external speaker 7 passes through the output holes 7a and is then emitted to the outside of the cabinet 2.

The camera 8 is installed on the back side of an upper part of the cabinet 2. The camera 8 can capture an image of a shooting target existing in the direction of the back of the mobile phone 1. The camera 8 includes an image sensor such as a CCD sensor or a CMOS sensor, and a lens used for forming an image of a shooting target on the image sensor.

Figure 4:
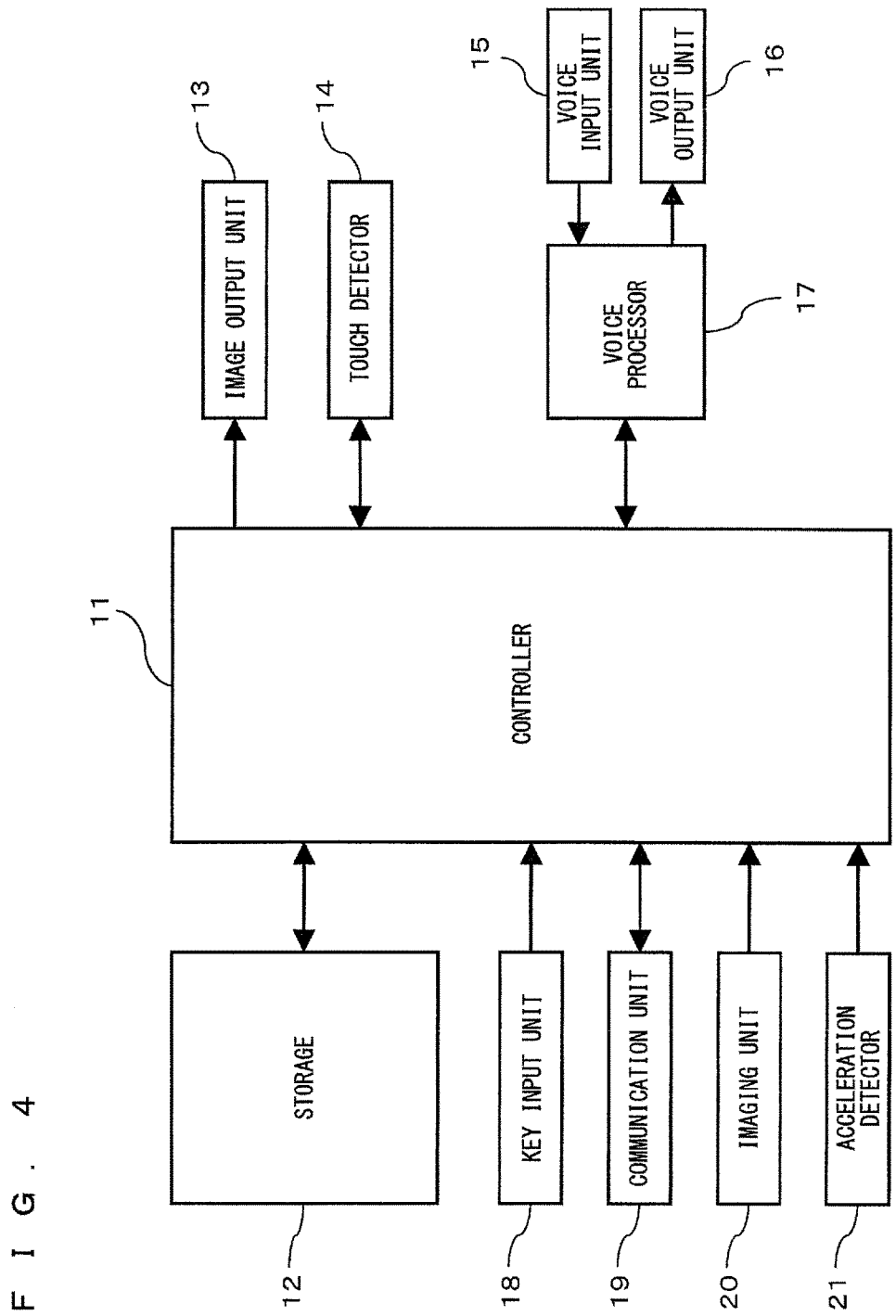
FIG. 4 illustrates a block diagram showing an entire structure of the mobile phone.

FIG. 4 illustrates a block diagram showing an entire structure of the mobile phone 1.

As illustrated in FIG. 4, the mobile phone 1 includes a controller 11, a storage 12, an image output unit 13, a touch detector 14, a voice input unit 15, a voice output unit 16, a voice processor 17, a key input unit 18, a communication unit 19, an imaging unit 20, and an acceleration detector 21.

The storage 12 includes a ROM, a RAM, and an external memory. Memories such as a ROM and a RAM can be regarded as computer-readable non-transitory storage media. The storage 12 stores various programs. The programs stored in the storage 12 include a control program for controlling each unit of the mobile phone 1 and additionally includes various application programs (simply called "applications" hereinafter). For example, the various types of applications in the storage 12 include a telephone application, a message application, a phonebook application (contacts), a camera application, a web browser application, a map application, a game application, and a schedule management application. The programs are stored in the storage 12 by a manufacturer at the time of manufacture of the mobile phone 1. The programs are also stored in the storage 12 through a communication network or a storage medium such as a memory card or a CD-ROM.

The storage 12 contains a working region in which data is stored that is used or generated temporarily at the time of execution of the programs.

The controller 11 includes a CPU. The controller 11 can control each unit forming the mobile phone 1 (storage 12, image output unit 13, touch detector 14, voice input unit 15, voice output unit 16, voice processor 17, key input unit 18, communication unit 19, imaging unit 20, acceleration detector 21, etc.) based on the programs stored in the storage 12.

The image output unit 13 includes the display 3 illustrated in FIG. 1. The image output unit 13 can display an image (screen) on the display 3 based on a control signal and an image signal from the controller 11. Further, the image output unit 13 can control turning on and off of the light of the display 3 and adjust the brightness of the display 3 based on a control signal from the controller 11.

The touch detector 14 includes the touch panel 4 illustrated in FIG. 1 and can detect a touch operation on the touch panel 4. More specifically, the touch detector 14 can detect a position of contact with the touch panel 4 by a contact subject such as a user's finger (this position will hereinafter be called a "touch position"). The touch detector 14 can output a position signal generated based on the detected touch position to the controller 11. A touch operation on the touch panel 4 is to touch a screen and an object displayed on the display 3 and can alternatively be called a touch operation on the display 3.

When a user's finger is in proximity to the display 3, specifically, the touch panel 4, the touch detector 14 can detect the position of the finger in proximity as a touch position. When the touch panel 4 of the touch detector 14 is a capacitive touch panel, for example, the sensitivity of the touch detector 14 is adjusted in such a manner that change in capacitance exceeds a first detection threshold when a finger is in proximity to the touch panel 4 and change in capacitance exceeds a second detection threshold when the finger contacts the touch panel 4. By employing the first and second detection thresholds, a distinction can be made between a state in which the finger is in proximity to the touch panel 4 but does not contact the touch panel 4 and a state in which the finger contacts the touch panel 4. In response to a command from the controller 11, the touch detector 14 can make a change between validating both of the first and second detection thresholds and validating only the second detection threshold.

The touch detector 14 detects capacitance at a given time interval. Based on change in the capacitance, the touch detector 14 generates a signal responsive to the state of touch of a finger with the touch panel 4 such as touch or release and outputs the resultant signal to the controller 11. The interval of detection of the capacitance can be set at an appropriate value in a manner that depends on power consumption by the touch detector 14.

When the front of the cabinet 2 including the touch panel 4 is covered by a transparent cover for example made of glass, a finger trying to touch the touch panel 4 contacts the cover and does not contact the touch panel 4. In this case, the first and second detection thresholds are set in such a manner that the touch panel 4 detects a touch position when the finger contacts the cover or in proximity to the cover.

FIGS. 5 and 6 each illustrate a schematic view showing a relationship between the touch panel 4 to detect a finger wearing a glove for protection against cold or for working and each of the first and second detection thresholds.

For example, when an operation is performed with a finger wearing a glove as illustrated in FIG. 5, the finger does not contact the touch panel 4 but the glove contacts the touch panel 4. Meanwhile, when an operation is performed with a finger not wearing a glove as illustrated in FIG. 6, the finger directly contacts the touch panel 4. The first and second detection thresholds are set in such a manner that a distinction can be made between capacitance responsive to a distance from a finger to the touch panel 4 determined when a glove contacts the touch panel 4 and capacitance responsive to a distance from the finger to the touch panel 4 determined when the finger contacts the touch panel 4.

More specifically, as illustrated in FIG. 5, capacitance is set at a first detection threshold Th1 when the capacitance is accumulated in the touch panel 4 with a finger being located in a position P1 slightly separated from the touch panel 4. The first detection threshold Th1 corresponding to the position P1 slightly separated from the touch panel 4 is called a "glove-touch threshold."

As illustrated in FIG. 6, capacitance is set at a second detection threshold Th2 (larger than the first detection threshold Th1) when the capacitance is accumulated in the touch panel 4 with a finger being located in a position P2 closer to the touch panel 4. The second detection threshold Th2 corresponding to the position P2 closer to the touch panel 4 is called a "finger-touch threshold." An interval between the positions P2 and P1 is set to be at least at the thickness of a glove or more.

When accumulated capacitance is larger than or equal to the glove-touch threshold Th1 and less than the finger-touch threshold Th2 with given detection timing, the touch detector 14 transmits a detection signal to the controller 11 indicating touch with the touch panel 4 by a finger wearing a glove (this touch will hereinafter be called "glove-touch"). After the glove-touch, when the accumulated capacitance is less than the glove-touch threshold Th1 with given detection timing, the touch detector 14 transmits a detection signal to the controller 11 indicating release of the finger wearing the glove (this release will hereinafter be called "glove-release"). After the glove-touch, when the accumulated capacitance is larger than or equal to the finger-touch threshold Th2 with given detection timing, the touch detector 14 also transmits a detection signal to the controller 11 indicating "glove-release." When the accumulated capacitance is larger than or equal to the finger-touch threshold Th2 with the given detection timing, the touch detector 14 transmits a detection signal to the controller 11 indicating touch with the touch panel 4 by the finger not wearing the glove (this touch will hereinafter be called "finger-touch"). After the finger-touch, when the accumulated capacitance is less than the finger-touch threshold Th2 with given detection timing, the touch detector 14 transmits a detection signal to the controller 11 indicating release of the finger not wearing the glove (this release will hereinafter be called "finger-release").

As described above, the touch detector 14 transmits a detection signal indicating each of glove-touch, glove-release, finger-touch, and finger-release. The controller 11 determines the substance of a touch operation depending on a combination of the types of detection signals received from the touch detector 14 using an application for touch operation detection. The controller 11 issues a triggering signal (event) responsive to the touch operation. In the below, an event issued when a touch operation is determined to be touch with the touch panel 4 by a finger or a glove will be called a "touch event." Further, an event issued when a touch operation is determined to be release of the finger or the glove from the touch panel 4 will be called a "release event." The controller 11 accepts notification of an event relating to a touch operation using an application different from the application for touch operation detection and executes a process responsive to the touch operation on the different application. A control process responsive to the touch operation is executed on the different application with no regard for whether the touch operation is glove-touch or finger-touch.

By the provision of the touch panel 4, a user is allowed to perform various touch operations on the display 3 by making his or her finger touch the touch panel 4 or moving the finger closer to the touch panel 4. For example, the touch operations include a tap operation, a flick operation, and a slide operation. The tap operation is an operation by a user of making his or her finger contact the touch panel 4 or moving the finger closer to the touch panel 4 and then releasing the finger from the touch panel 4 within short time. The flick operation is an operation by a user of making his or her finger contact the touch panel 4 or moving the finger closer to the touch panel 4 and then flipping or sweeping the touch panel 4 in any direction with the finger. The slide operation is an operation by a user of moving his or her finger in any direction while making the finger continue contacting the touch panel 4 or keeping the finger in proximity to the touch panel 4.

For example, when the touch detector 14 detects a touch position and the touch position goes out of the detection by the touch detector 14 within a predetermined first length of time from when the touch position is detected, the controller 11 determines that a touch operation is a tap operation. When the touch position moves a predetermined first distance or more within a second length of time from when the touch position is detected and then the touch position goes out of the detection by the touch detector 14, the controller 11 determines that the touch operation is a flick operation. When the touch position moves a predetermined second distance or more after the touch position is detected, the controller 11 determines that the touch operation is a slide operation.

The voice input unit 15 includes the microphone 5. The voice input unit 15 can output an electrical signal from the microphone 5 to the voice processor 17.

The voice output unit 16 includes the call speaker 6 and the external speaker 7. The voice output unit 16 receives an electrical signal input from the voice processor 17. The voice output unit 16 can output sound through the call speaker 6 or the external speaker 7.

The voice processor 17 can process an electrical signal from the voice input unit 15 by means of A/D conversion, for example, and output a digital voice signal resulting from the conversion to the controller 11. The voice processor 17 can process a digital voice signal from the controller 11 by means of a decoding process and D/A conversion, for example, and output an electrical signal resulting from the conversion to the voice output unit 16.

The key input unit 18 includes at least one or more hardware keys. For example, the key input unit 18 includes a power key, etc. used for powering on the mobile phone 1. The key input unit 18 can output a signal corresponding to a pressed hardware key to the controller 11.

The communication unit 19 includes a circuit for signal conversion, an antenna for transmission and receipt of radio waves, etc. that are prepared for making a call and communication. The communication unit 19 can convert a signal for a call or communication input from the controller 11 to a radio signal, and transmit the radio signal resulting from the conversion to a communication partner such as a base station or a different communication device through the antenna. Further, the communication unit 19 can convert a radio signal received through the antenna to a signal of a format available by the controller 11, and output the signal resulting from the conversion to the controller 11.

The imaging unit 20 includes the camera 8 illustrated in FIG. 2, an imaging control circuit, etc. The imaging unit 20 can capture moving images or a still image in response to a control signal from the controller 11, execute various image processes and an encoding process on moving image data about the captured moving images or still image data about the captured still image, and output the processed moving image data or still image data to the controller 11.

The acceleration detector 21 includes a triaxial acceleration sensor. The triaxial acceleration sensor can detect accelerations occurring in the three directions including the front-back direction, the vertical direction, and the horizontal direction with respect to the mobile phone 1. The acceleration detector 21 can output an acceleration signal indicating accelerations detected by the triaxial acceleration sensor to the controller 11.

Figure 7:
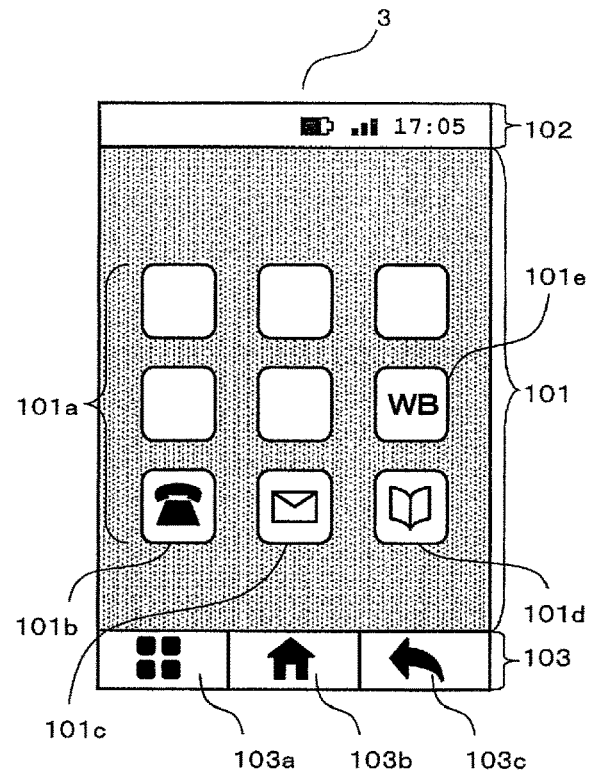
FIG. 7 illustrates a display on which a home screen is displayed.

FIG. 7 illustrates the display 3 on which a home screen 101 is displayed.

In the mobile phone 1, various screens are displayed on the display 3 and a user performs various touch operations on the screens. For example, the home screen 101 is displayed as an initial screen on the display 3. As illustrated in FIG. 7, the home screen 101 includes multiple startup icons 101a used for staring various applications. The multiple startup icons 101a include a telephone icon 101b, a mail icon 101c, a phonebook icon 101d, and a browser icon 101e, for example.

A notification bar 102 and an operation key group 103 are displayed on the display 3 together with the home screen 101. The notification bar 102 is displayed above the home screen 101 on the display 3. The notification bar 102 includes current time, a level meter indicating a battery level, an intensity meter indicating the intensity of radio waves, etc. The operation key group 103 is displayed below the home screen 101. The operation key group 103 includes a setting key 103a, a home key 103b, and a back key 103c. The setting key 103a is a key mainly used for displaying a setting screen for making various settings on the display 3. The home key 103b is a key mainly used for changing display on the display 3 to the home screen 101 from a screen different from the home screen 101. The back key 103c is a key mainly used recovering a process having been executed in a previous step.

To use various applications, a user performs a tap operation on the startup icon 101a corresponding to an application to be used. In this way, the application is started and an execution screen based on the application is displayed. Even after the execution screen corresponding to the application being executed is displayed or even after the execution screen changes in response to progress of the application, the notification bar 102 still continues to be displayed on the display 3.

First Embodiment

As described above, the touch detector 14 detects capacitance at a given time interval. Based on the level of the detected capacitance, the touch detector 14 outputs a detection signal indicating any of glove-touch, glove-release, finger-touch, and finger-release to the controller 11.

Figure 8:
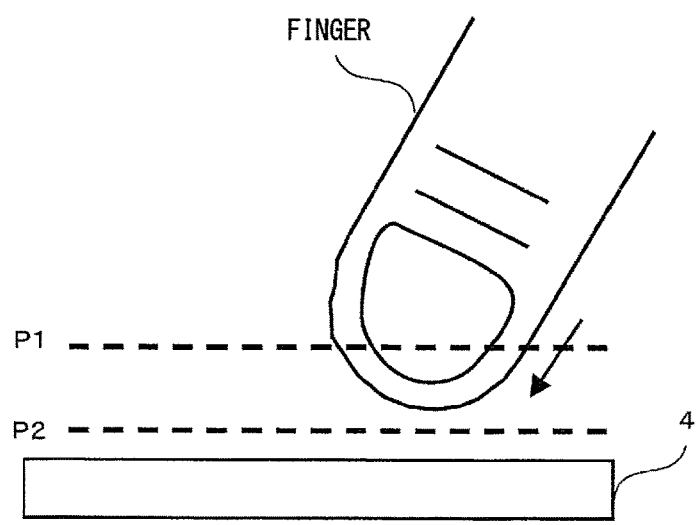
FIG. 8 illustrates a schematic view showing a relationship between the touch panel and a finger being moved closer to the touch panel slowly in terms of their positions.
Figure 9:
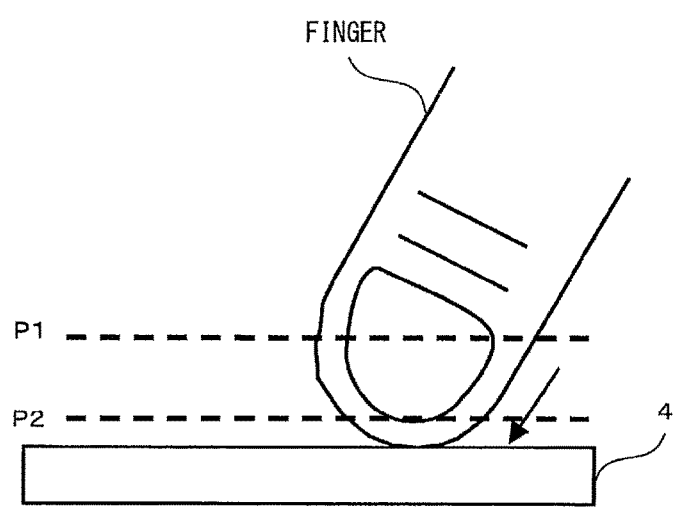
FIG. 9 illustrates a schematic view showing a relationship between the touch panel and the finger being moved closer to the touch panel slowly in terms of their positions.

FIGS. 8 and 9 each illustrate a schematic view showing a relationship between the touch panel 4 and a finger being moved closer to the touch panel 4 slowly in terms of their positions. FIG. 10 illustrates a conceptual view showing a detection signal output from the touch detector 14 when the finger is moved closer to the touch panel 4 slowly and timing of issuance of a touch event and a release event by the controller 11.

When the finger is moved closer to the touch panel 4 slowly, the finger is first located between the positions P1 and P2 as illustrated in FIG. 8. Thus, the touch detector 14 outputs a detection signal indicating glove-touch Gt. When the finger is located in n position closer to the touch panel 4 than the position P2 as illustrated in FIG. 9 with subsequent detection timing, the touch detector 14 outputs a detection signal indicating glove-release Gr. When the finger is located in the position closer to the touch panel 4 than the position P2 as illustrated in FIG. 9 with the subsequent detection timing, the touch detector 14 outputs a detection signal indicating finger-touch Ft. When the finger is located in a position farther from the touch panel 4 than the position P2 with subsequent detection timing, the touch detector 14 outputs a detection signal indicating finger-release Fr.

The controller 11 may be configured to be controlled to issue a touch event in response to each occurrence of glove-touch or finger-touch and issue a release event in response to each occurrence of glove-release or finger-release. In this case, when a finger is moved closer to the touch panel 4 slowly, four events including a touch event T1, a release event R1, a touch event T2, and a release event R2 are issued, as illustrated in FIG. 10.

FIGS. 11 and 12 each illustrate an example of entry on a lock screen 104 based on a touch detection control process according to Comparative Example.

The lock screen 104 includes an entry box 104a and a numerical keypad 104b. A key in the numerical keypad 104b having been subjected to a tap operation is entered in the entry box 104a.

When a finger is moved closer to the numerical keypad 104b slowly, the touch event T1, the release event R1, the touch event T2, and the release event R2 are issued as described above. In this case, in response to issuance of the touch event T1 and the release event R1 in a first pair, the numerical keypad 104b is regarded as having been subjected to a tap operation. Then, as illustrated in FIG. 11, a value of a key in the numerical keypad 104b having been touched is entered in the entry box 104a. In response to subsequent issuance of the touch event T2 and the release event R2 in a second pair, the numerical keypad 104b is regarded as having been subjected to an additional tap operation. Then, as illustrated in FIG. 12, a value of a key in the numerical keypad 104b having been touched is entered in the entry box 104a.

Hence, it is likely that, when both the glove-touch threshold Th1 and the finger-touch threshold Th2 are valid, a single tap operation on the numerical keypad 104b intended by a user will be handled as two tap operations.

According to a first embodiment, to prevent a tap operation with a finger being moved closer to the touch panel 4 slowly from being handled as two tap operations, the controller 11 executes an event skip control process.

Figure 14:
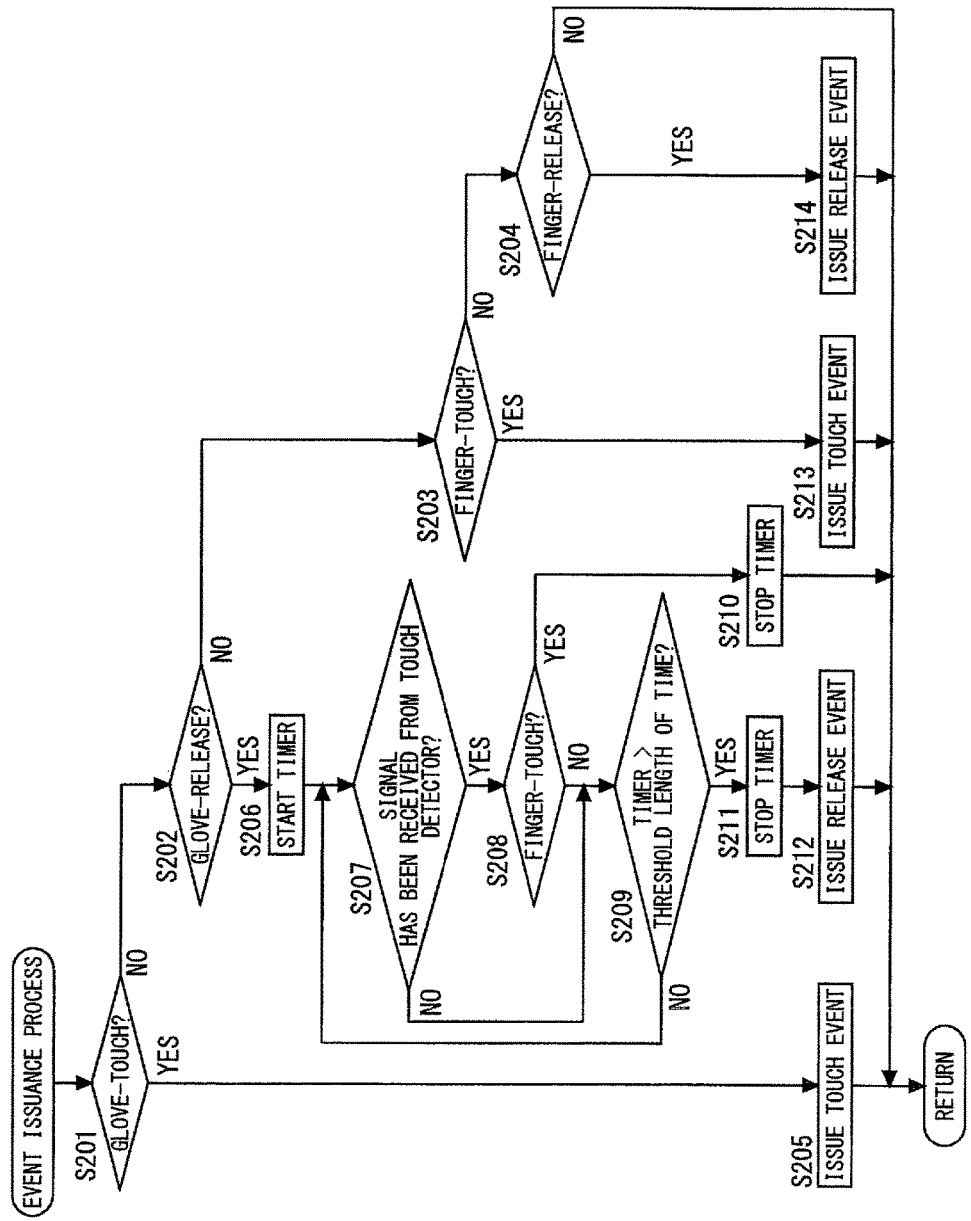
FIG. 14 illustrates a flowchart showing the touch detection control process.

FIGS. 13 and 14 each illustrate a flowchart showing a touch detection control process according to the first embodiment. The control process of FIGS. 13 and 14 is started by the start of the mobile phone 1 and proceeds in parallel with other control processes such as a control process on each application.

After the mobile phone 1 is started, the touch detection control process is executed and the event skip control process is executed in the touch detection control process. Processing steps of S206 to S212 in the touch detection control process illustrated in FIG. 14 correspond to the event skip control process.

Referring to FIG. 13, after the mobile phone 1 is started, the controller 11 first checks to see whether or not screen display on the display 3 has been started (S101). Start of screen display on the display 3 includes the case where the home screen illustrated in FIG. 7 is displayed on the display 3 after the mobile phone 1 is powered on, and the case where the mobile phone 1 in a sleep state is released from lock and then the home screen or a screen corresponding to a certain application is displayed on the display 3, for example. The sleep state is a state in which the mobile phone 1 has bee powered on while the light of the display 3 is turned off and a touch operation on the display 3 is invalid or restricted.

When screen display on the display 3 has been started (S101: YES), the controller 11 determines whether or not a detection signal has been received from the touch detector 14 (S102). The glove-touch threshold Th1 and the finger-touch threshold Th2, respectively corresponding to the positions P1 and P2 illustrated in each of FIGS. 5 and 6, are validated at the touch detector 14. In this case, the touch detector 14 outputs a detection signal indicating any of glove-touch, glove-release, finger-touch, and finger-release at a given time interval.

When a detection signal has not been received from the touch detector 14 (S102: NO), the controller 11 determines whether or not the screen display on the display 3 has been finished (S103). When the screen display on the display 3 has not been finished (S103: NO), the controller 11 returns the process to S102 and waits for receipt of a detection signal from the touch detector 14. When a detection signal has been received from the touch detector 14 (S102: YES), the controller 11 executes an event issuance process indicated in FIG. 14 (S104).

Referring to FIG. 14, upon execution of the event issuance process, the controller 11 determines whether the received detection signal indicates glove-touch (S201), glove-release (S202), finger-touch (S203), or finger-release (S204).

When the detection signal from the touch detector 14 indicates glove-touch (S201: YES), the controller 11 issues a touch event (S205).

When the detection signal from the touch detector 14 indicates glove-release (S202: YES), the controller 11 starts a timer to start measuring a length of time elapsed since the detection signal indicating glove-release was obtained from the touch detector 14 (S206). After starting the timer, the controller 11 determines whether or not a detection signal has been received from the touch detector 14 (S207). When a detection signal has not been received from the touch detector 14 (S207: NO), the controller 11 advances the process to S209. When a detection signal has been received from the touch detector 14 (S207: YES), the controller 11 determines whether or not the detection signal from the touch detector 14 indicates finger-touch (S208). When the detection signal from the touch detector 14 does not indicate finger-touch (S208: NO), the controller 11 determines whether or not the length of time measured by the timer exceeds a given threshold length of time Tt (S209). The threshold length of time Tt is set at a length at least longer than a time interval of output of a detection signal by the touch detector 14. For example, the threshold length of time Tt is set at a length several times larger than the time interval of output of a detection signal by the touch detector 14. When the length of time measured by the timer does not exceed the threshold length of time Tt (S209: NO), the controller 11 returns the process to S207. In this way, it is determined whether or not the touch detector 14 has output a detection signal indicating finger-touch for a lapse of the threshold length of time Tt after output of the detection signal indicating glove-release from the touch detector 14.

When a detection signal indicating finger-touch has been received from the touch detector 14 for a lapse of the threshold length of time Tt (S208: YES), the controller 11 stops the timer (S210) and advances the process to S103 without issuing both of a touch event and a release event. In this way, when there is finger-touch within a short length of time after the occurrence of glove-release, issuance of events responsive to these detection signals is skipped.

When a count on the timer exceeds the threshold length of time Tt (S209: YES) while a detection signal indicating finger-touch has not been received from the touch detector 14 (S208: NO) for a lapse of the threshold length of time Tt, the controller 11 stops the timer (S211) and issues a release event (S212). When finger-touch is determined not to have occurred continuously with glove-release in this way, this glove-release is regarded as resulting from release of a finger wearing a glove. Then, a release event is issued. In this way, the touch operation with the finger wearing the glove is detected as illustrated in FIG. 5 and a function responsive to the touch operation is executed on each application.

When the detection signal from the touch detector 14 indicates finger-touch (S203: YES), the controller 11 issues a touch event (S213). When the detection signal from the touch detector 14 indicates finger-release (S204: YES), the controller 11 issues a release event (S214).

When the event issuance process is finished in the aforementioned way or when the detection signal from the touch detector 14 does not indicate any of glove-touch, glove-release, finger-touch, and finger-release (S204: NO), the controller 11 advances the process to S103 illustrated in FIG. 13. When determining that the screen display has not been finished, the controller 11 monitors receipt of a subsequent signal from the touch detector 14 (S102).

When the screen display is finished (S103), the controller 11 completes the touch detection control process and makes the touch detector 14 stop the touch detection process. For example, when a fixed length of time has elapsed in the absence of any operation to bring the mobile phone 1 into the sleep state, the screen display is finished.

When the touch event or the release event on the touch panel 4 is issued in the aforementioned way, the controller 11 executes a process responsive to the notified event on an application while an execution screen corresponding to this application is displayed on the display 3. When a touch event responsive to a button icon is notified while this bottom icon is displayed on the display 3 and then a release event is notified within a given length of time, for example, this bottom icon is regarded as having been subjected to a tap operation. In this case, the controller 11 executes a process on the application responsive to the tap operation on the button icon while an execution screen corresponding to this application is displayed on the display 3.

Figure 15:
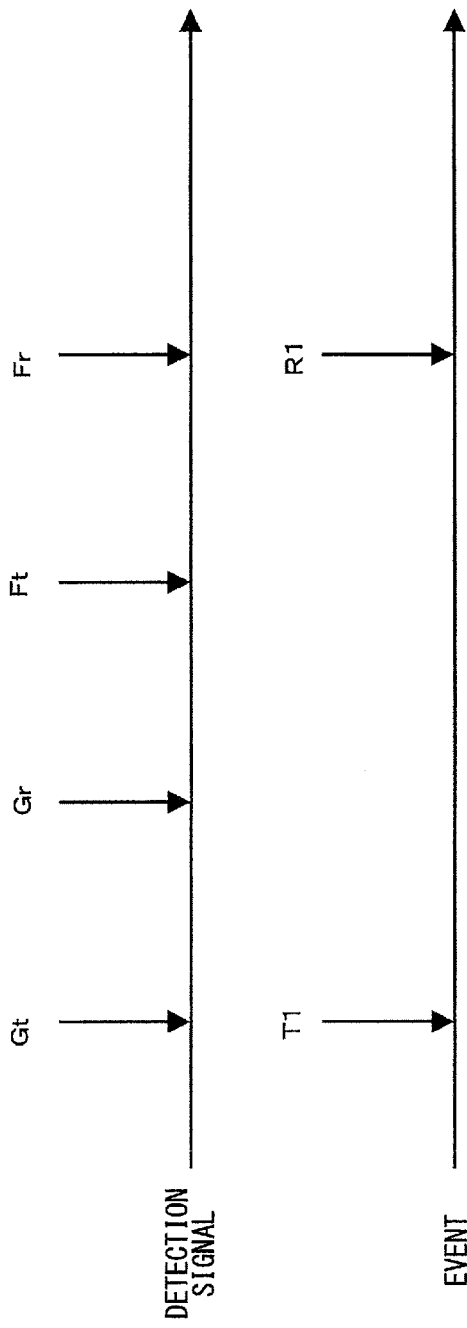
FIG. 15 illustrates a conceptual view showing a detection signal output from a touch detector when a finger is moved closer to the touch panel slowly and timing of issuance of a touch event and a release event by the controller.

FIG. 15 illustrates a conceptual view showing a detection signal output from the touch detector 14 when a finger is moved closer to the touch panel 4 slowly and timing of issuance of a touch event and a release event by the controller 11 according to the first embodiment.

As described above, when the finger is moved closer to the touch panel 4 slowly, the touch detector 14 sequentially outputs detection signals indicating glove-touch Gt, glove-release Gr, finger-touch Ft, and finger-release Fr in this order.

According to the first embodiment, as illustrated in the flowchart of FIG. 14, when a detection signal indicating glove-touch Gt has been received (S201: YES), the controller 11 issues the touch event T1 (S205). When a detection signal indicating finger-touch Ft has been received (S208: YES) for a lapse of the threshold length of time Tt (S209: NO) after receipt of a detection signal indicating glove-release Gr (S202: YES), issue of a touch event and a release event is skipped. A detection signal indicating finger-release Fr is thereafter received from the touch detector 14 (S204: YES). Then, the controller 11 issues the release event R1 (S214).

Figure 16:
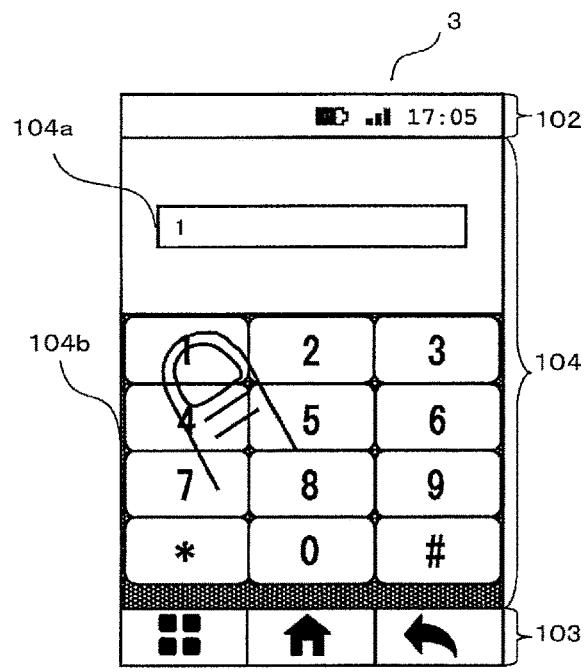
FIG. 16 illustrates a schematic view showing an example of entry on the lock screen with a finger being moved closer to the touch panel slowly.

As described above, when a detection signal indicating finger-touch Ft has been received for a lapse of the threshold length of time Tt after the occurrence of glove-release Gr, issuance of a release event and a touch event responsive to these detection signals is skipped. Thus, when a finger is moved closer to the numerical keypad 104b slowly, only the touch event T1 and the release event R1 in a single group are issued. In this way, this movement of the finger is regarded as a single tap operation, so that one value is entered in the entry box 104a as illustrated in FIG. 16.

According to the first embodiment, executing the event skip control process can make it unlikely that a touch operation with a finger being moved closer to the touch panel 4 slowly will be handled as two tap operations.

Second Embodiment

According to the first embodiment, to prevent a tap operation with a finger being moved closer to the touch panel 4 slowly from being handled as two tap operations, issuance of a release event is skipped when a detection signal indicating finger-touch has been received for a lapse of the given threshold length of time Tt after receipt of a detection signal indicating glove-release.

Figure 17:
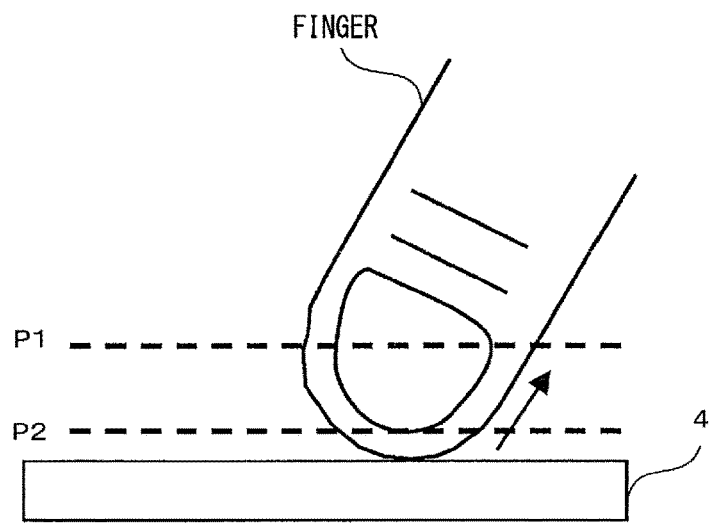
FIG. 17 illustrates a schematic view showing a relationship between the touch panel and a finger being moved farther from the touch panel slowly in terms of their positions.
Figure 18:
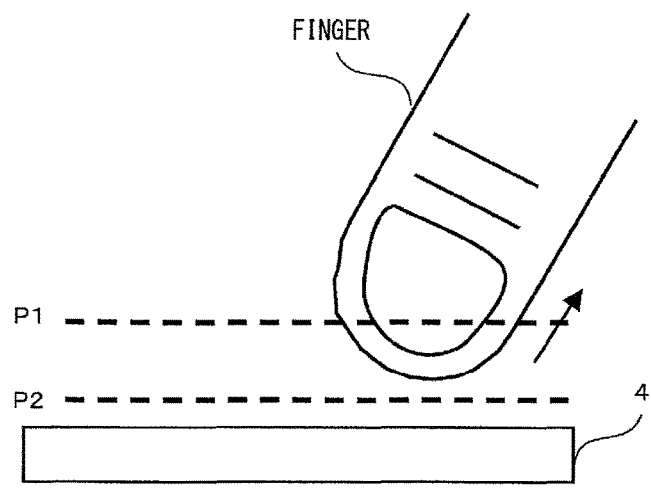
FIG. 18 illustrates a schematic view showing a relationship between the touch panel and the finger being moved farther from the touch panel slowly in terms of their positions.
Figure 19:
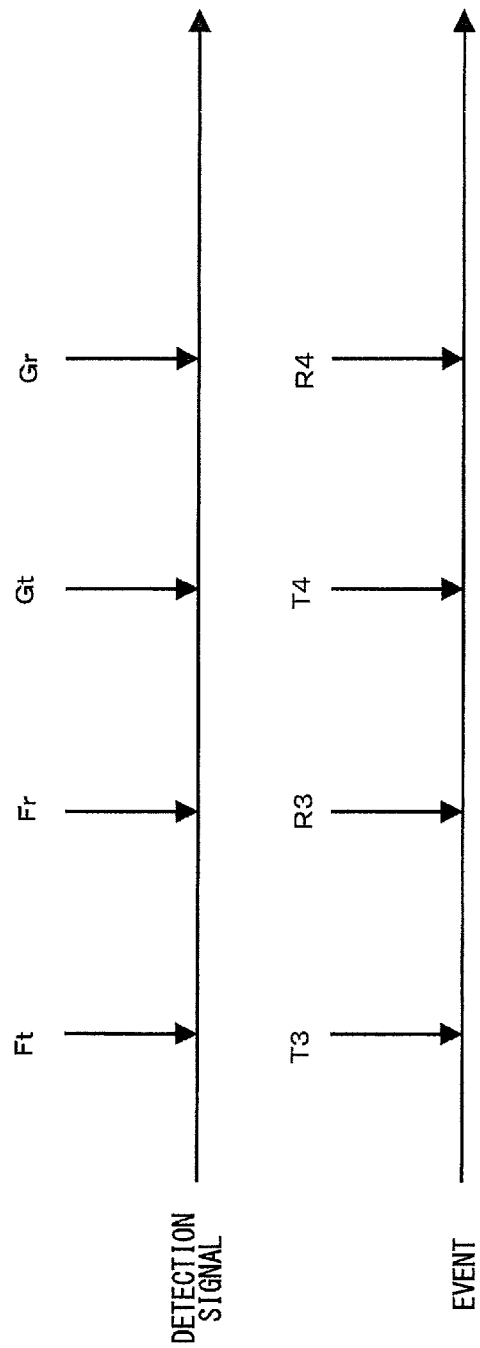
FIG. 19 illustrates a conceptual view showing timing of issuance of a touch event and a release event by the controller.

FIGS. 17 and 18 each illustrate a schematic view showing a relationship between the touch panel 4 and a finger being moved farther from the touch panel 4 slowly in terms of their positions. FIG. 19 illustrates a conceptual view showing a detection signal output from the touch detector 14 when a finger is moved farther from the touch panel 4 slowly and timing of issuance of a touch event and a release event by the controller 11 according to the first embodiment.

When a finger in a state of contacting the touch panel 4 illustrated in FIG. 17 is moved farther from the touch panel 4 slowly as illustrated in FIG. 18, this movement of the finger may be handled as two tap operations.

As illustrated in FIG. 19, when the finger is moved farther from the touch panel 4 slowly, the touch detector 14 outputs a detection signal indicating finger-tough Ft and outputs a detection signal indicating finger-release Fr with subsequent detection timing. The touch detector 14 outputs a detection signal indicating glove-touch Ft with subsequent detection timing and outputs a detection signal indicating glove-release Gr with subsequent detection timing. Hence, in this case, four events including a touch event T3, a release event R3, a touch event T4, and a release event R4 are issued and handled as two tap operations.

Figure 20:
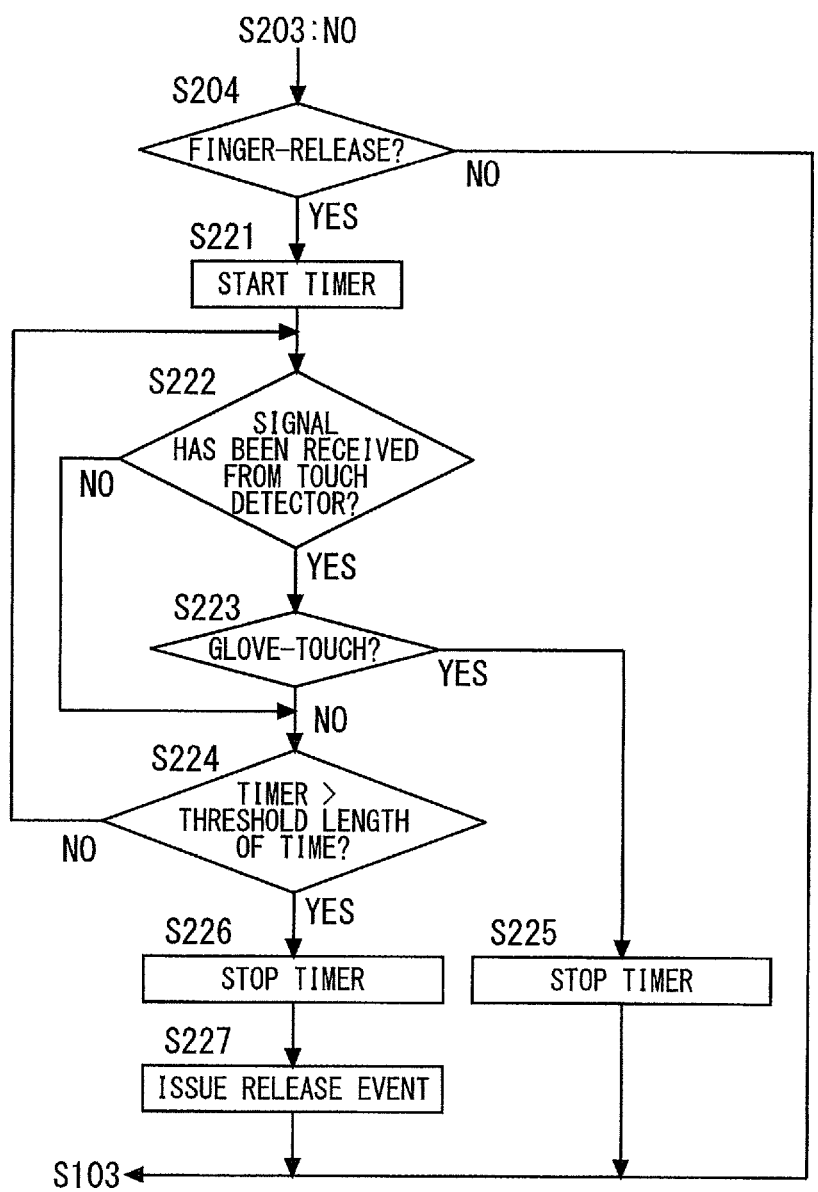
FIG. 20 illustrates a flowchart showing a touch detection control process.

Then, according to a second embodiment, issuance of an event relating to glove-touch occurring continuously with finger-release is skipped, as illustrated in the flowchart of FIG. 20. The flowchart of FIG. 20 includes partial change from the flowchart of FIG. 14 and additionally includes processing steps of S221 to S227.

When a detection signal from the touch detector 14 indicates finger-release (S204: YES), the controller 11 starts a timer (S221) to determine whether or not the touch detector 14 has output a detection signal indicating glove-touch (S222, S223) for a lapse of a given threshold length of time Tt (S224).

When a detection signal indicating glove-touch has been received from the touch detector 14 (S223: YES) for a lapse of the threshold length of time Tt, the controller 11 stops the timer (S225) and advances the process to S103 without issuing both of a touch event and a release event. In this way, when there is glove-touch within a short length of time after the occurrence of finger-release, issuance of events responsive to these detection signals is skipped.

When a count on the timer exceeds the threshold length of time Tt (S224: YES) while a detection signal indicating glove-touch has not been received from the touch detector 14 for a lapse of the threshold length of time Tt (S223: NO), the controller 11 stops the timer (S226) and issues a release event (S227). When glove-touch is determined not to have occurred continuously with finger-release in this way, this finger-release is regarded as resulting from release of a finger not wearing a glove. Then, a release event is issued.

As described above, when a detection signal indicating glove-touch Gt has been received for a lapse of the threshold length of time Tt after the occurrence of finger-release Fr, issuance of a release event and a touch event responsive to these detection signals is skipped. Thus, when a finger is moved farther from the touch panel 4 slowly, only a touch event and a release event in a single group are issued. In this way, this movement of the finger is regarded as a single tap operation.

According to the second embodiment, executing the event skip control process can make it unlikely that a touch operation with a finger being moved farther from the touch panel 4 slowly will be handled as two tap operations.

Third Embodiment

In many cases, an operation by a user on the display 3 is performed with a finger. During the cold season, an operation may be performed with a finger wearing a glove. Meanwhile, even in the cold season, an operation for example in indoor space may be performed with a finger from which a glove has been removed.

Figure 21:
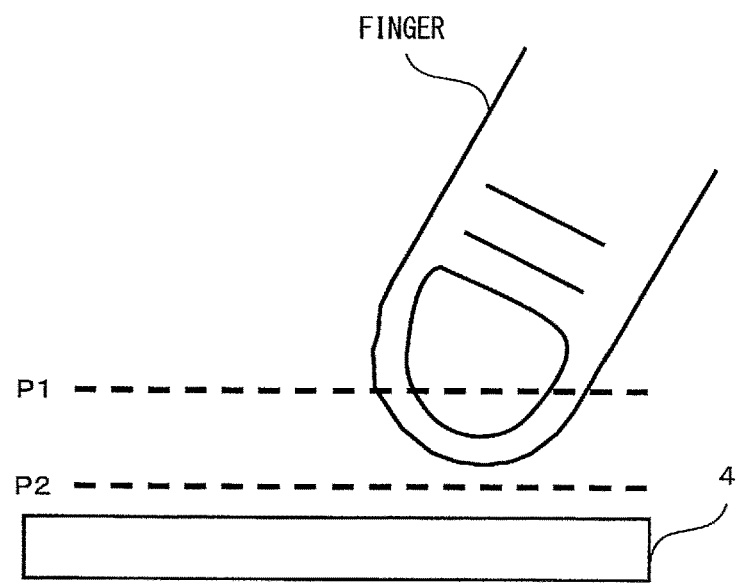
FIG. 21 illustrates a schematic view showing a relationship between the touch panel and a finger from which a glove has been removed in terms of their positions.
Figure 22:
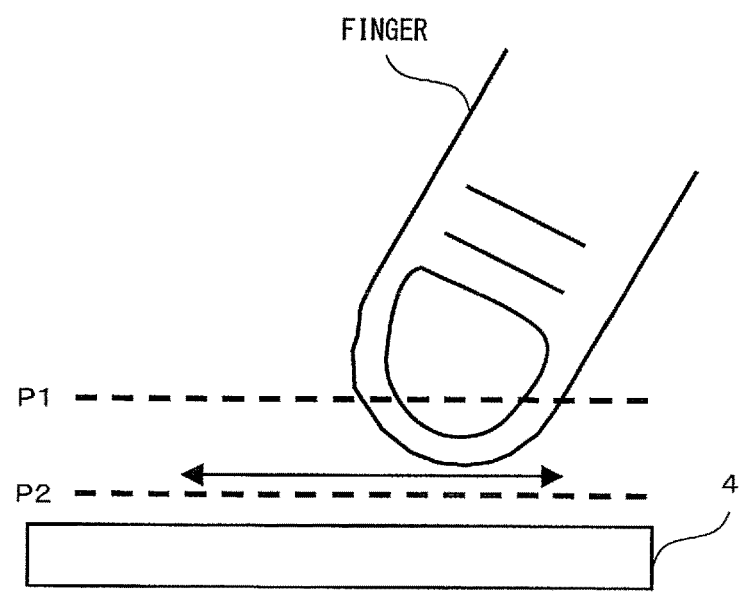
FIG. 22 illustrates a schematic view showing a relationship between the touch panel and the finger from which the glove has been removed in terms of their positions.

FIGS. 21 and 22 each illustrate a schematic view showing a relationship between the touch panel 4 and a finger from which a glove has been removed in terms of their positions.

For example, when the finger from which the glove has been removed is moved closer to the touch panel 4 as illustrated in FIG. 21, capacitance accumulated in the touch panel 4 first exceeds the glove-touch threshold Th1. Then, a touch operation is detected at sensitivity determined on the assumption that the touch operation is performed with the finger wearing the glove. In this case, when a user tries to operate the touch panel 4 with the finger not wearing the glove as illustrated in FIG. 22, a touch operation such as a tap operation or a slide operation is detected in a position slightly separated from the touch panel 4. This causes a risk in that user's feeling of operation on the touch panel 4 is worsened.

It is very likely that a touch operation performed after a finger-touch is detected once by the touch detector 14 will be an operation with a finger not wearing a glove. Thus, in the mobile phone 1 according to a third embodiment, the controller 11 executes a control process of making a switch between a "high-sensitive mode" by which the sensitivity of the touch panel 4 is set to be appropriate for a finger wearing a glove and a "normal mode" by which the sensitivity of the touch panel 4 is set to be appropriate for a finger not wearing a glove. Specifically, the controller 11 executes a mode switching control process. For example, both the glove-touch threshold Th1 and the finger-touch threshold Th2 are validated in the "high-sensitive mode." Only the finger-touch threshold Th2 is validated in the "normal mode."

Figure 23:
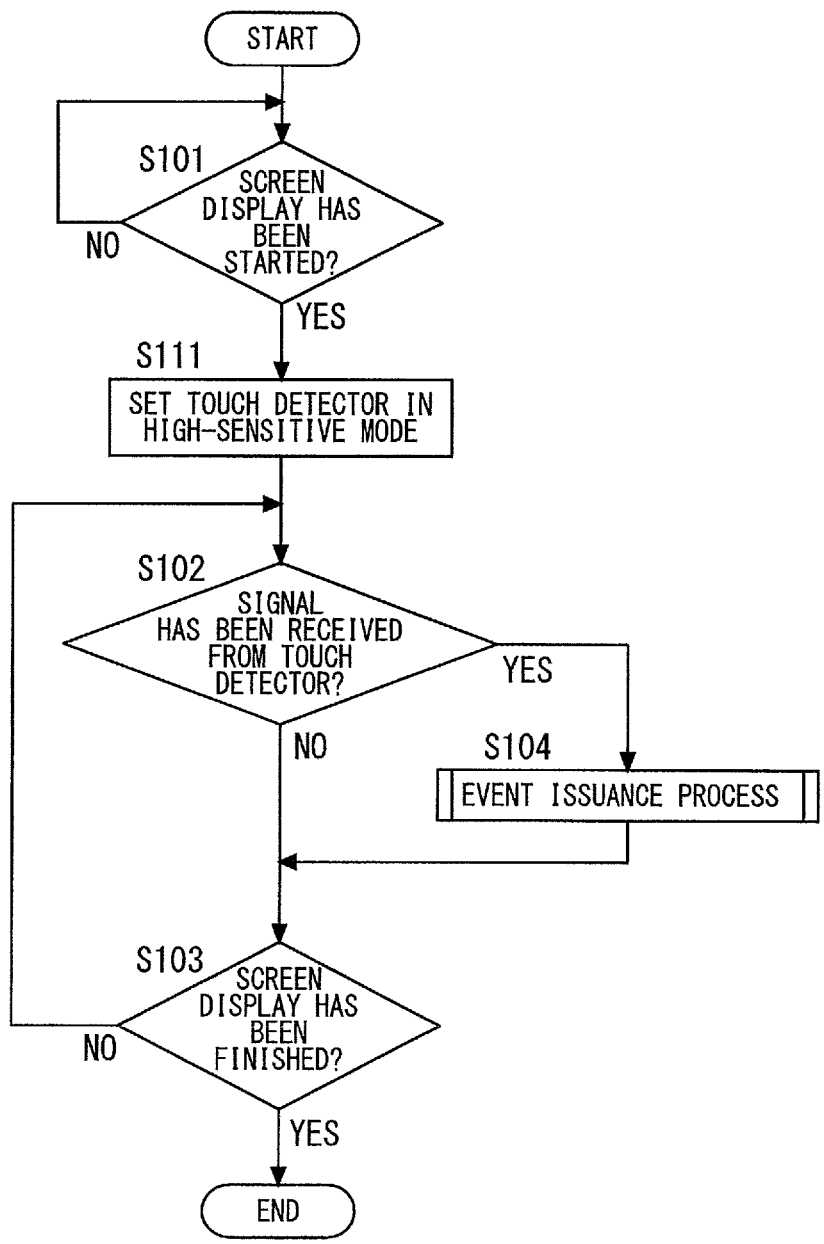
FIG. 23 illustrates a flowchart showing a touch detection control process.
Figure 24:
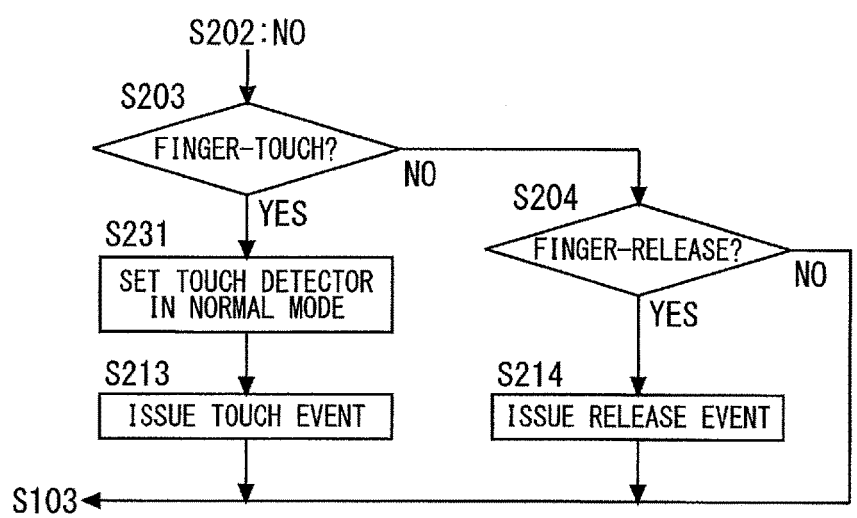
FIG. 24 illustrates a flowchart showing an event issuance process.

FIGS. 23 and 24 each illustrate a flowchart showing a touch detection control process according to the third embodiment. The flowchart of FIG. 23 includes partial change from the flowchart of FIG. 13 according to the first embodiment and additionally includes a processing step of S111. The flowchart of FIG. 24 includes partial change from the flowchart of FIG. 14 according to the first embodiment and additionally includes a processing step of S231.

When screen display on the display 3 has been started (S101: YES), the controller 11 sets the touch detector 14 in the high-sensitive mode (S111). This validates the glove-touch threshold Th1 and the finger-touch threshold Th2 at the touch detector 14 that respectively correspond to the positions P1 and P2 illustrated in each of FIGS. 5 and 6. In this case, the touch detector 14 outputs a detection signal indicating any of glove-touch, glove-release, finger-touch, and finger-release at a given time interval.

When a detection signal has been received from the touch detector 14 (S102: YES), the controller 11 executes the event issuance process (S104).

When the detection signal from the touch detector 14 indicates finger-touch (S203: YES), the controller 11 sets the touch detector 14 in the normal mode (S231). This validates only the finger-touch threshold Th2 at the touch detector 14 that corresponds to the position P2 illustrated in each of FIGS. 5 and 6. In this case, the touch detector 14 outputs a detection signal indicating finger-touch or finger-release at a given detection interval. After setting the touch detector 14 in the normal mode, the controller 11 issues a touch event on the touch panel 4 (S213).

FIGS. 25 to 28 each illustrate a schematic view showing how a mode is set at the touch detector 14 depending on the state of an operation on the touch panel 4.

Figure 25:
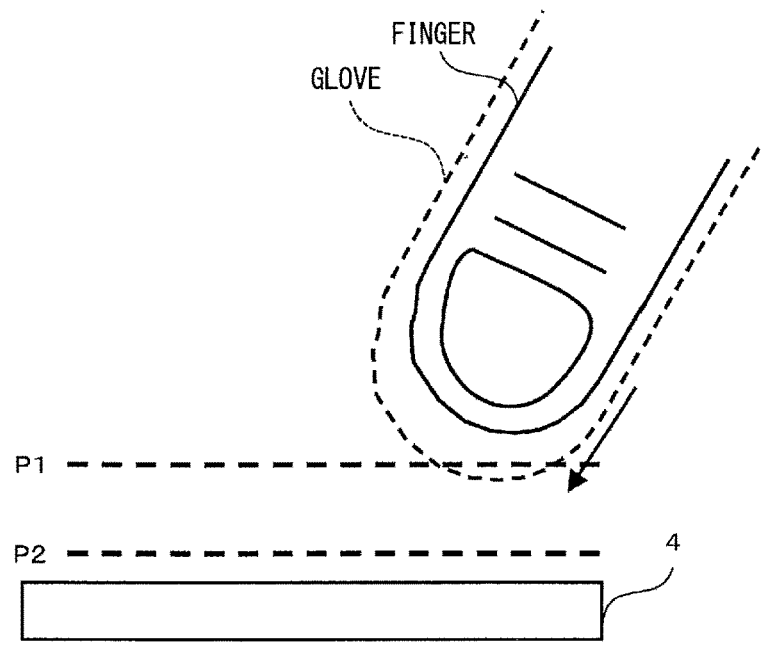
FIG. 25 illustrates a schematic view showing how a mode is set at the touch detector depending on the state of an operation on the touch panel.

As illustrated in FIG. 25, when a finger is widely separated from the touch panel 4, the touch detector 14 is set in the high-sensitive mode in the processing step of S111. In the state of FIG. 11, the finger is located in a position farther from the touch panel 4 than the position P1 corresponding to the glove-touch threshold Th1. In this case, a detection signal is not output from the touch detector 14, so that a determination made in the processing step of S102 is NO.

Figure 26:
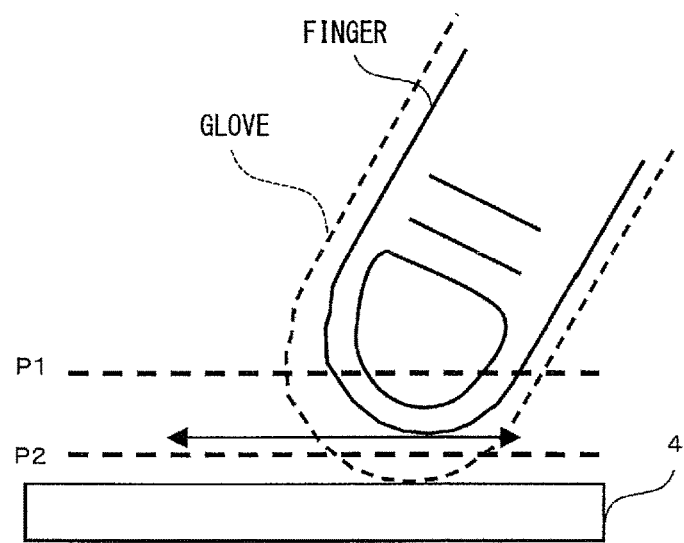
FIG. 26 illustrates a schematic view showing how a mode is set at the touch detector depending on the state of an operation on the touch panel.

As illustrated in FIG. 26, when the touch panel 4 is operated with a finger wearing a glove, the finger is located between the positions P1 and P2. In this case, the touch detector 14 outputs a detection signal indicating glove-touch. Thus, a determination made in the processing step of S201 of FIG. 14 is YES. Then, a touch event is issued in the processing step of S205. When the finger wearing the glove is released from the touch panel 4 thereafter, the finger is located in a position farther from the touch panel 4 than the position P1. In this case, the touch detector 14 outputs a detection signal indicating glove-release, so that a determination made in the processing step of S202 is YES. When a detection signal indicating finger-touch has not been output within a short length of time thereafter, a release event is issued in the processing step of S212.

As described above, according to the third embodiment, in the absence of any detection of finger-touch after a screen is displayed on the display 3, the touch detector 14 is set in the high-sensitive mode. Thus, even a user wearing a glove is still allowed to perform a touch operation on the touch panel 4 properly.

Figure 27:
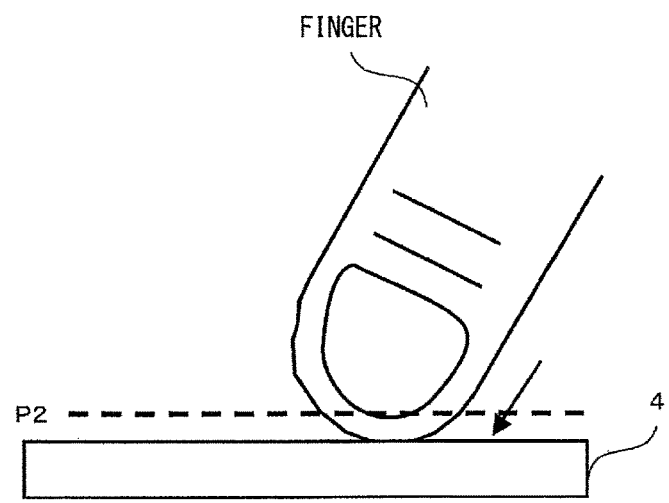
FIG. 27 illustrates a schematic view showing how a mode is set at the touch detector depending on the state of an operation on the touch panel.

As illustrated in FIG. 27, when the touch panel 4 is operated with a finger from which a glove has been removed, the finger is located in a position closer to the touch panel 4 than the position P2. In this case, the touch detector 14 outputs a detection signal indicating finger-touch. Thus, a determination made in the processing step of S203 is YES. Then, the touch detector 14 is set in the normal mode in the processing step of S231. Next, a touch event is issued in the processing step of S213. When the finger is released from the touch panel 4 thereafter, the finger is located in a position farther from the touch panel 4 than the position P2. In this case, the touch detector 14 outputs a detection signal indicating finger-release, so that a determination made in the processing step of S204 is YES. Then, a release event is issued in the processing step of S214.

Figure 28:
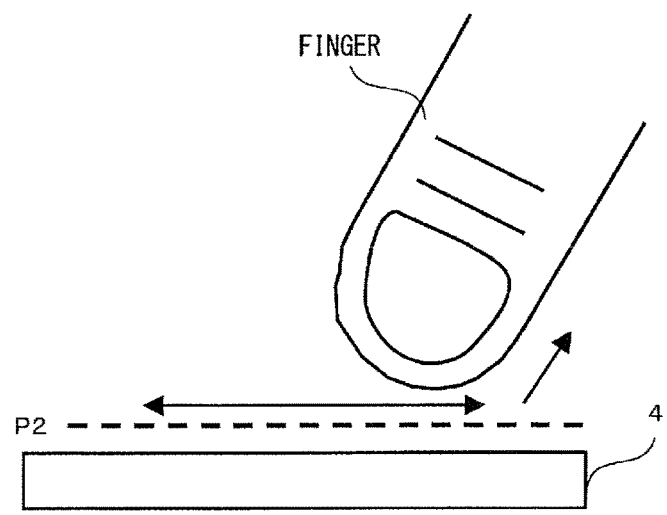
FIG. 28 illustrates a schematic view showing how a mode is set at the touch detector depending on the state of an operation on the touch panel.

As described above, according to the third embodiment, the touch detector 14 is set in the normal mode after detection of finger-touch. Thus, when a finger is moved farther from the touch panel 4 than the position P2 as illustrated in FIG. 28, the touch detector 14 does not output a detection signal. This can prevent detection of a touch operation such as a tap operation or a slide operation performed in a position separated from the touch panel 4 with a finger from which a glove has been removed. In this way, worsening of user's feeling of operation can be prevented.

According to the third embodiment, the touch detector 14 is set in the normal mode after detection of finger-touch. This can make it unlikely that, even when a finger contacts the touch panel 4 and is then moved farther from the touch panel 4 slowly, a touch operation will be handled as two tap operations.

When the screen display on the display 3 is finished thereafter and then screen display is started again, the high-sensitive mode is set again at the touch detector 14 in the processing step of S111.

As described above, according to the third embodiment, when screen display on the display 3 is finished and then screen display is started again, the high-sensitive mode is set at the touch detector 14. Thus, even when a user operates the touch panel 4 with a finger during the previous screen display and then wears a glove, the user is still allowed to perform a touch operation on the touch panel 4 properly.

While some embodiments of the present disclosure have been described above, the present disclosure is never to be restricted to some embodiments described above, etc. In addition to some embodiments described above, an embodiment of the present disclosure can be subject to various modifications.

First Modification

The touch detector 14 outputs a detection signal indicating finger-touch when capacitance accumulated in the touch panel 4 is larger than or equal to the finger-touch threshold corresponding to the position P2. Thus, it is likely that the touch detector 14 will output a detection signal indicating finger-touch not only in the case where the touch panel 4 is operated with a finger but also in the case where a major part of a surface of the touch panel 4 is covered with a cheek during a call, for example. When a mode at the touch detector 14 is switched to the normal mode in this case, it may be impossible to operate the touch panel 4 smoothly with a finger wearing a glove after the call. In the mobile phone 1 according to a first modification, when the touch detector 14 outputs a detection signal indicating finger-touch, a mode at the touch detector 14 is switched to the normal mode depending on the area of a region where the touch panel 4 is touched.

Figure 29:
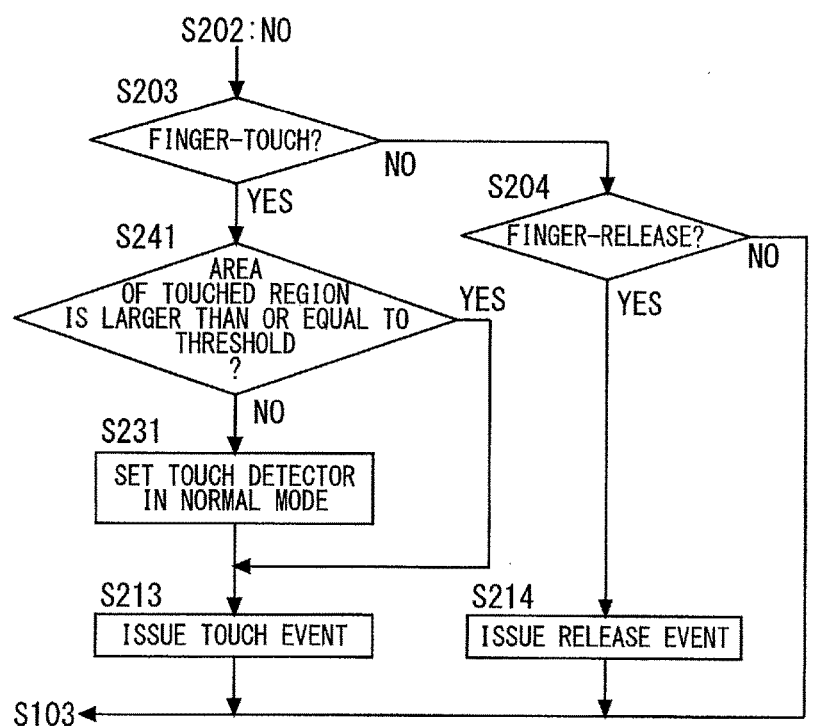
FIG. 29 illustrates a flowchart showing a touch detection control process.

FIG. 29 illustrates a flowchart showing a touch detection control process according to the first modification. The flowchart of FIG. 29 includes partial change from the flowchart of FIG. 24 according to the third embodiment and additionally includes a processing step of S241.

When a detection signal from the touch detector 14 indicates finger-touch (S203: YES), the controller 11 determines whether or not the area of a region where the touch panel 4 is touched is larger than or equal to a given threshold Ta (S241). For example, the threshold Ta is set in such a manner that a distinction can be made between an area of contact of the touch panel 4 with a cheek during a call and an area of contact of the touch panel 4 with a finger during a touch operation. When the area of the touched region is larger than or equal to the given threshold Ta (S241: YES), the controller 11 issues a touch event without setting the touch detector 14 at the normal mode (S213). When the area of the touched region is less than the given threshold Ta (S241: NO), the controller 11 sets the touch detector 14 in the normal mode (S231), and then issues a touch event (S213).

FIGS. 30 and 31 each illustrate a schematic view showing how a mode is set at the touch detector 14 depending on the state of an operation on the touch panel 4.

As illustrated in FIG. 30, when a cheek contacts the touch panel 4 during a call, the area of the touched region of the touch panel 4 is larger than the area of a region of the touch panel 4 such as one illustrated in FIG. 31 where the touch panel 4 is touched during a touch operation. Thus, in this case, the area of the touched region of the touch panel 4 exceeds the threshold Ta, so that a determination made in the processing step of S241 is YES. As a result, a touch event is issued in the processing step of S213 while the touch detector 14 is not set in the normal mode.

As described above, according to the first modification, even in the presence of detection of finger-touch by the touch detector 14, the touch detector 14 is not set in the normal mode when the area of a touched region of the touch panel 4 is large. Thus, even when a user continues wearing a glove after a call is finished, the user is still allowed to perform a touch operation smoothly on the touch panel 4. A cheek contacts the touch panel 4 not only during a call but also during check of a message on an answering machine. Thus, even when a user continues wearing a glove after playback of the message on the answering machine is finished, the user is still allowed to perform a touch operation smoothly on the touch panel 4.

Second Modification

In the mobile phone 1 according to a second modification, a mode at the touch detector 14 is switched to the high-sensitive mode with timing of finish of a call.

FIG. 32 illustrates a flowchart showing a call control process according to the second modification.

Processing steps of S303 and S304 in the call control process illustrated in FIG. 32 correspond to the mode switching control process.

After the mobile phone 1 is started, the controller 11 first checks to see whether or not a call has been started (S301). The start of call mentioned herein includes making an outgoing call from a user and responding to an incoming call by the user, for example. When a call has been started (S301: YES), the controller 11 executes processes relating to the call including display of a call screen and input and output processes on received voice, etc. (S302). The controller 11 checks to see whether or not the call has been finished (S303). When the call has not been finished (S303: NO), the controller 11 continues executing the processes relating to the call. When the call is finished (S303: YES), the controller 11 sets the touch detector 14 in the high-sensitive mode (S304).

Figure 33:
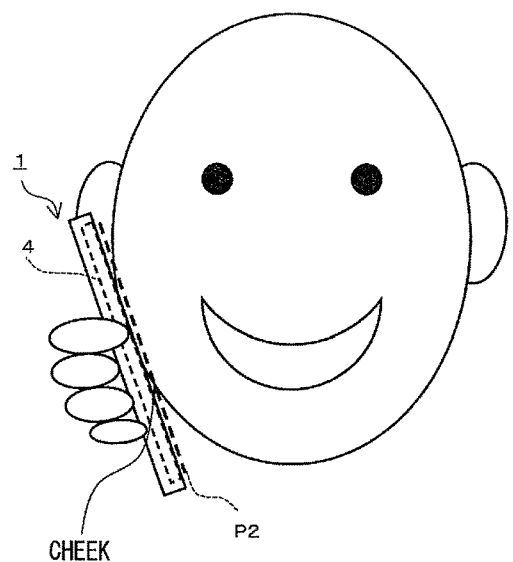
FIG. 33 illustrates a schematic view showing how a mode is set at the touch detector depending on the state of a call.
Figure 34:
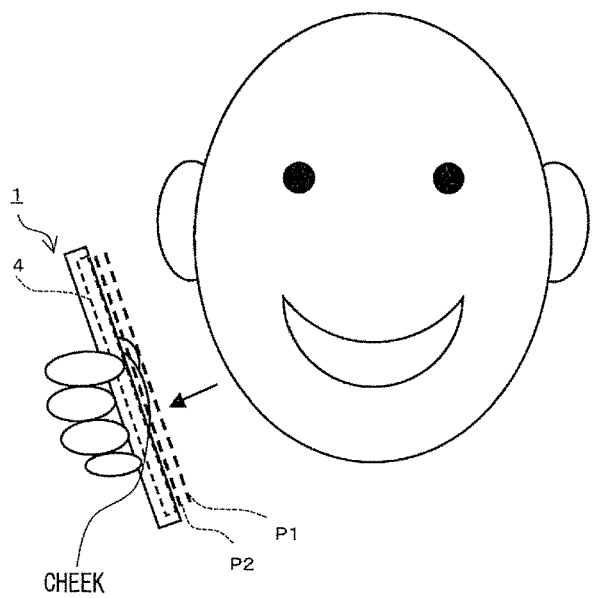
FIG. 34 illustrates a schematic view showing how a mode is set at the touch detector depending on the state of a call.

FIGS. 33 and 34 each illustrate a schematic view showing how a mode is set at the touch detector 14 depending on the state of a call.

As illustrated in FIG. 33, a cheek contacts the surface of the touch panel 4 during a call. Thus, in the processing step of S231 illustrated in FIG. 24, the touch detector 14 is set in the normal mode. When the call is finished, the cheek is released from the surface of the touch panel 4. Thus, in the processing step of S304 illustrated in FIG. 32, the high-sensitive mode is set again at the touch detector 14.

As described above, according to the second modification, when a cheek contacts the surface of the touch panel 4 so the touch detector 14 is set in the normal mode, the touch detector 14 is set in the high-sensitive mode with timing of finish of a call. Thus, even when a user wears a glove after the call is finished, the user is still allowed to perform a touch operation smoothly on the touch panel 4.

The call control process according to the second modification may be combined with the touch detection control process according to the third embodiment or with the aforementioned touch detection control process according to the first modification.

Other Modifications

According to the first embodiment, a determination of whether or not issuance of an event is to be skipped is made depending on a time lag between the occurrence of glove-release and that of finger-release. A determination of whether or not issuance of an event is to be skipped may be made depending on a different time lag. For example, issuance of an event may be skipped depending on a time lag between the occurrence of glove-touch and that of finger-touch. As another example, issuance of an event may be skipped depending on a time lag between the occurrence of glove-touch and that of finger-release.

According to the third embodiment, as illustrated in FIG. 24, the touch detector 14 is set in the normal mode when a detection signal from the touch detector 14 indicates finger-touch (S203: YES). The touch detector 14 may also be set in the normal mode when the touch detector 14 outputs a detection signal indicating finger-release (S204: YES).

According to the first modification, as illustrated in FIG. 29, control is executed in such a manner that, even when a detection signal from the touch detector 14 indicates finger-touch (S203: YES), the touch detector 14 is not set in the normal mode on condition that the area of a touched region is larger than or equal to the given threshold Ta (S241: YES). Alternatively, when the area of the touched region is larger than or equal to the given threshold Ta, the normal mode may be set once at the touch detector 14. When the touch detector 14 outputs a detection signal indicating finger-release thereafter (S204: YES), the high-sensitive mode may be set again at the touch detector 14.

According to the third embodiment and the first and second modifications, by setting the touch detector 14 in the normal mode after detection of finger-touch, it becomes unlikely that the touch detector 14 will detect a touch operation performed in a position separated from the touch panel 4 with a finger not wearing a glove. Meanwhile, the two detection modes including the high-sensitive mode and the normal mode may not be set at the touch detector 14 but may be set at the controller 11. In this case, the controller 11 may validate two detection signals indicating glove-touch and finger-touch in the high-sensitive mode. In the normal mode, the controller 11 may validate a detection signal indicating finger-touch and may disregard a detection signal indicating glove-touch.

The present disclosure is applicable not only to a mobile phone such as a smartphone but also to mobiles phones of other types such as a straight phone, a folding phone, and a sliding phone.

According to some embodiments described above, when accumulated capacitance is less than the threshold Th1 with given detection timing, a detection signal indicating glove-release is output. Meanwhile, even when accumulated capacitance is less than the threshold Th1 with given detection timing, a signal indicating glove-release may not be output. A signal indicating glove-release may be output when the accumulated capacitance is less than a glove-touch threshold Th3 (Th3<Th1). This can make it unlikely that a signal indicating glove-touch and a signal indicating glove-release will be output repeatedly to cause repeated entry of characters, etc. in response to a phenomenon such as vibration of a finger occurring when a tap operation is performed with the finger in the vicinity of the position P1 slightly separated from the touch panel 4.

The present disclosure is applicable not only to a mobile phone but also to various mobile terminals such as a personal digital assistant (PDA) and a tablet PC. The present disclosure is further applicable to a digital camera, a digital video camera, a mobile music player, and a mobile game machine. Specifically, the present disclosure is applicable to various types of mobile electronic devices with displays on which operations are to be performed.

While the mobile phone 1 has been described in detail above, the foregoing description is in all aspects illustrative and does not restrict the present disclosure. The various modifications described above can be applied in combination as long as they do not contradict each other. It is understood that numerous modifications not illustrated can be devised without departing from the scope of the present disclosure.

The invention claimed is:

1. A mobile electronic device comprising:
a display;
an operation detector capable of detecting an operation on the display performed by a part of a human body; and
a processor, wherein the operation detector outputs a first detection signal when the part of the human body is located between a first position and a second position closer to the display than to the first position, and then outputs a second detection signal when the part of the human body is located farther from the display than the first position,
the operation detector outputs the second detection signal when the part of the human body is located closer to the display than to the second position after the outputting of the first detection signal, then outputs a third detection signal when the part of the human body is located closer to the display than to the second position, and then outputs a fourth detection signal when the part of the human body is located farther from the display than the second position, and
the processor is configured to:
perform a first process corresponding to the first detection signal when the operation detector outputs the first detection signal;
perform a second process corresponding to the second detection signal, when the operation detector outputs the second detection signal following the outputting of the first detection signal and does not output the third detection signal within a first length of time from the outputting of the second detection signal;
perform neither the second process nor a third process corresponding to the third detection signal, when the operation detector outputs the second detection signal following the outputting of the first detection signal and outputs the third detection signal within the first length of time from the outputting of the second detection signal; and perform a fourth process corresponding to the fourth detection signal when the operation detector outputs the fourth detection signal.

2. The mobile electronic device according to claim 1, wherein the operation detector outputs the fourth detection signal when the part of the human body is located between the first position and the second position after the outputting of the third detection signal, then outputs the first detection signal when the part of the human body is located between the first position and the second position, and then outputs the second detection signal when the part of the human body is located farther from the display than the first position, and the processor:

performs the fourth process, when the operation detector outputs the fourth detection signal following the outputting of the third detection signal and does not output the first detection signal within a second length of time from the outputting of the fourth detection signal; and performs neither the first process nor the fourth process, when the operation detector outputs the fourth detection signal following the outputting of the third detection signal and outputs the first detection signal within the second length of time from the outputting of the fourth detection signal.

3. The mobile electronic device according to claim 1, wherein a detection mode of the mobile electronic device includes a first mode in which the operation detector outputs the first to fourth detection signals, and a second mode in which the operation detector outputs the third and fourth detection signals without outputting the first and second detection signals, and when the operation detector outputs the third detection signal while the first mode is set as the detection mode, the second mode is set as the detection mode.

4. A method of controlling a mobile electronic device, the mobile electronic device comprising a display and an operation detector capable of detecting an operation on the display performed by a part of a human body, wherein the operation detector outputs a first detection signal when the part of the human body is located between a first position and a second position closer to the display than to the first position, and then outputs a second detection signal when the part of the human body is located farther from the display than the first position, and the operation detector outputs the second detection signal when the part of the human body is located closer to the display than to the second position after the outputting of the first detection signal, then outputs a third detection signal when the part of the human body is located closer to the display than to the second position, and then outputs a fourth detection signal when the part of the human body is located farther from the display than the second position, the method comprising:

performing a first process corresponding to the first detection signal when the operation detector outputs the first detection signal;

performing a second process corresponding to the second detection signal, when the operation detector outputs the second detection signal following the outputting of the first detection signal and does not output the third detection signal within a first length of time from the outputting of the second detection signal;

performing neither the second process nor a third process corresponding to the third detection signal, when the operation detector outputs the second detection signal following the outputting of the first detection signal and outputs the third detection signal within the first length of time from the outputting of the second detection signal; and performing a fourth process corresponding to the fourth detection signal when operation detector outputs the fourth detection signal.

5. A computer-readable non-transitory recording medium storing a control program for controlling a mobile electronic device comprising a display and an operation detector capable of detecting an operation on the display performed by a part of a human body, wherein the operation detector outputs a first detection signal when the part of the human body is located between a first position and a second position closer to the display than to the first position, and then outputs a second detection signal when the part of the human body is located farther from the display than the first position, and the operation detector outputs the second detection signal when the part of the human body is located closer to the display than to the second position after the outputting of the first detection signal, then outputs a third detection signal when the part of the human body is located closer to the display than to the second position, and then outputs a fourth detection signal when the part of the human body is located farther from the display than the second position, the control program causing the mobile electronic device to:

perform a first process corresponding to the first detection signal when the operation detector outputs the first detection signal;

perform a second process corresponding to the second detection signal, when the operation detector outputs the second detection signal following the outputting of the first detection signal and does not output the third detection signal within a first length of time from the outputting of the second detection signal;

perform neither the second process nor a third process corresponding to the third detection signal, when the operation detector outputs the second detection signal following the outputting of the first detection signal and outputs the third detection signal within the first length of time from the outputting of the second detection signal; and perform a fourth process corresponding to the fourth detection signal when the operation detector outputs the fourth detection signal.

* * * * *